(12) United States Patent
Taguchi et al.

(10) Patent No.: US 10,594,431 B2
(45) Date of Patent: Mar. 17, 2020

(54) OPTICAL TRANSCEIVER AND CONTROL METHOD

(71) Applicant: NIPPON TELEGRAPH AND TELEPHONE CORPORATION, Tokyo (JP)

(72) Inventors: Katsuhisa Taguchi, Yokosuka (JP); Kota Asaka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/309,016

(22) PCT Filed: Jun. 19, 2017

(86) PCT No.: PCT/JP2017/022498
§ 371 (c)(1),
(2) Date: Dec. 11, 2018

(87) PCT Pub. No.: WO2017/221878
PCT Pub. Date: Dec. 28, 2017

(65) Prior Publication Data
US 2019/0312661 A1   Oct. 10, 2019

(30) Foreign Application Priority Data
Jun. 20, 2016   (JP) ................ 2016-122165

(51) Int. Cl.
*H04B 10/40* (2013.01)
*H04J 14/02* (2006.01)
*H04B 10/572* (2013.01)

(52) U.S. Cl.
CPC .......... *H04J 14/0212* (2013.01); *H04B 10/40* (2013.01); *H04B 10/572* (2013.01); *H04J 14/0265* (2013.01)

(58) Field of Classification Search
CPC combination set(s) only.
See application file for complete search history.

(56) References Cited

U.S. PATENT DOCUMENTS 7,072,584 B1 *   7/2006   Lichtman ............ H04J 14/0283
                                                        398/3
2004/0037301 A1 *  2/2004  Shachar .................. H04L 12/43
                                                        370/404

(Continued)

FOREIGN PATENT DOCUMENTS

| JP | 2007-195227 A | 8/2007 |
| WO | WO-2007/086514 A1 | 8/2007 |
| WO | WO-2014/136264 A1 | 9/2014 |

OTHER PUBLICATIONS

S. Kaneko, T. Yoshida, S. Furusawa, M. Sarashina, H. Tamai, A. Suzuki, T. Mukojima, S. Kimura, and N. Yoshimoto, "First λ-tunable dynamic load-balancing operation enhanced by 3-msec bidirectional hitless tuning on symmetric 40-Gbit/sWDM/TDM-PON" in proc. OFC'2014, San Francisco CA, Th5A.4, 2014.

(Continued)

*Primary Examiner* — Omar S Ismail

(57) ABSTRACT

An optical transceiver includes a wavelength-tunable transmission unit configured to transmit an optical transmission signal, a wavelength-tunable reception unit configured to receive an optical reception signal, a wavelength table configured to store a plurality of combinations of a transmission wavelength and a reception wavelength, an input terminal configured to input a wavelength selection signal, and a control unit configured to select one combination of the transmission wavelength and the reception wavelength from the wavelength table based on the wavelength selection signal, and perform transmission wavelength control for setting the selected transmission wavelength in the wavelength-tunable transmission unit as a wavelength of the (Continued)

optical transmission signal and reception wavelength control for setting the selected reception wavelength in the wavelength-tunable reception unit as a wavelength of the optical reception signal.

7 Claims, 22 Drawing Sheets

(56) References Cited

U.S. PATENT DOCUMENTS

| | | | | |
|---|---|---|---|---|
| 2006/0153496 A1* | 7/2006 | Tanobe | ............... | H04J 14/0227 385/24 |
| 2009/0016726 A1* | 1/2009 | Suzuki | ............... | H04B 10/0793 398/79 |
| 2014/0147118 A1* | 5/2014 | Lee | ....................... | H04J 14/025 398/67 |
| 2015/0098704 A1* | 4/2015 | Gao | .................... | H04J 14/0246 398/68 |
| 2015/0236797 A1* | 8/2015 | Jeong | ................. | H04Q 11/0005 398/202 |
| 2015/0341137 A1* | 11/2015 | Kaneko | ................ | H04B 10/272 398/67 |

OTHER PUBLICATIONS

International Search Report for PCT/JP2017/022498, ISA/JP, dated Aug. 29, 2017, with English translation attached.

* cited by examiner

FIG. 3

| NUMBER OF PULSES | WAVELENGTH PAIR |
|---|---|
| 1 | ($\lambda s1$, $\lambda r1$) |
| 2 | ($\lambda s2$, $\lambda r2$) |
| 3 | ($\lambda s3$, $\lambda r3$) |
| 4 | ($\lambda s4$, $\lambda r4$) |

| CONTROL VOLTAGE | WAVELENGTH PAIR |
|---|---|
| V1 | ($\lambda s1$, $\lambda r1$) |
| V2 | ($\lambda s2$, $\lambda r2$) |
| V3 | ($\lambda s3$, $\lambda r3$) |
| V4 | ($\lambda s4$, $\lambda r4$) |

FIG. 13

| CONTROL VOLTAGE | WAVELENGTH PAIR |
|---|---|
| 0~T/4 | ($\lambda$s1, $\lambda$r1) |
| T/4~2T/4 | ($\lambda$s2, $\lambda$r2) |
| 2T/4~3T/4 | ($\lambda$s3, $\lambda$r3) |
| 3T/4~T | ($\lambda$s4, $\lambda$r4) |

FIG. 15

| CONTROL VOLTAGE | WAVELENGTH PAIR |
|---|---|
| 0 | ($\lambda s1$, $\lambda r1$) |
| 0~T/3 | ($\lambda s2$, $\lambda r2$) |
| T/3~2T/3 | ($\lambda s3$, $\lambda r3$) |
| 2T/3~T | ($\lambda s4$, $\lambda r4$) |

FIG. 17

| BURST CONTROL SIGNAL | CONTROL VOLTAGE VALUE | OPTICAL TRANSMISSION SIGNAL OUTPUT |
| --- | --- | --- |
| BURST-ENABLE SIGNAL | Hi | ON |
| | Low | OFF |
| BURST-DISABLE SIGNAL | Hi | OFF |
| | Low | ON |

OPTICAL TRANSCEIVER AND CONTROL METHOD

CROSS-REFERENCE TO RELATED APPLICATIONS

This application is a 371 U.S. National Stage of International Application No. PCT/JP2017/022498, filed Jun. 19, 2017, which claims priority to Japanese Patent Application No. 2016-122165, filed Jun. 20, 2016. The disclosures of the above applications are incorporated herein by reference.

TECHNICAL FIELD

The present invention relates to optical transmission and reception.

BACKGROUND ART

In recent years, introduction of a passive optical network (PON) system as an optical access system that supports a rapidly spreading Fiber to the Home (FTTH) service has progressed worldwide. In a PON system, one optical line terminal (OLT) disposed in a housing station accommodates optical network units (ONU) disposed in a plurality of subscriber homes through an optical splitter disposed in the middle of an optical fiber transmission line. The PON system is an optical access system that realizes high economic efficiency by sharing optical fiber transmission lines, an optical splitter, and OLTs among a plurality of subscribers.

At present, in Japan, a Gigabit Ethernet-PON (GE-PON) system having a transmission quantity of 1 Gb/s has been mainly commercially introduced (Ethernet is a registered trademark). In addition, as a next-generation optical access system realizing a higher speed, standardization of 10 G-EPON and XP-PON having a total transmission capacity of a 10 Gb/s level has been completed, and research and development thereof are progressing worldwide.

In light of such an increase in the transmission speed, as a next PON system at the 10 Gb/s level, NG-PON2 has been discussed on the Full Service Access Network (FSAN) forum. In the NG-PON2, in addition to an increase in speed from that of a conventional PON system, improvement of the access network is set as a goal. As the NG-PON2, a time and wavelength-division multiplexing (TWDM)-PON system has been reviewed. The TWDM-PON system is able to achieve an increase in accommodating efficiency, efficiency of maintenance management and the like by using wavelength-division multiplexing (WDM) utilizing characteristics of light in addition to time division multiplexing (TDM) that has been used in a conventional PON system.

CITATION LIST

Patent Literature

[Non-Patent Literature 1]
S. Kaneko, T. Yoshida, S. Furusawa, M. Sarashina, H. Tamai, A. Suzuki, T. Mukojima, S. Kimura, and N. Yoshimoto, "First λ-tunable dynamic load balancing operation enhanced by 3-msec bidirectional hitless tuning on symmetric 40-Gbit/s WDM/TDM-PON" in proc. OFC' 2014, San Francisco Calif., Th5A. 4, 2014.

SUMMARY OF INVENTION

Technical Problem

Hitherto, a decrease in size and a decrease in cost have been realized using optical transceiver modules having common specifications not only in optical communication systems such as PON systems but all the way back to short reach and the like. Particularly, in data center solutions, there are strong requests for decreases in size of optical transceiver modules, and accordingly, technical advances for decreases in size have been remarkable.

Meanwhile, also in the TWDM-PON that realizes a wavelength-tunable function of the system using a wavelength-tunable transceiver, there are requests for standardization of optical transceiver modules and a decrease in size of the optical transceivers. Particularly, transceivers mounted in ONUs are installed inside customers' homes and thus are requested to have further decreases in size, and decreases in size toward a Small Form-factor Pluggable+ (SFP+) size that is a small-size specification of a 10 G module are expected.

In addition, there is a limit on transceiver control terminals included in a module, and there is a problem in that the number of idle terminals is small in SFP+. For this reason, in order to realize a decrease in size of a wavelength-tunable transceiver used for the TWDM-PON, it is necessary to decrease the number of terminals of an optical transceiver module used for transmission/reception wavelength control as much as possible.

For example, in order to allow a wavelength to be selectable from four wavelengths, generally, two-pin terminals are provided as terminals for wavelength setting, and a voltage applied to the two-pin terminals is set as one of "00," "01," "10," and "11." In the case that the number of settable wavelengths is extended to eight, three-pin terminals are necessary as terminals for wavelength setting. Furthermore, when a transmission wavelength and a reception wavelength are individually set, the number of pins to be included in terminals is four for selecting the wavelengths from four wavelengths, and the number of pins to be included in terminals is six for selecting the wavelengths from eight wavelengths.

In view of the situation described above, an object of the present invention is to provide an optical transceiver that can be used as an optical transceiver module, and a control method capable of decreasing the number of terminals used for controlling optical signals to be transmitted and received

Solution to Problem

According to a first aspect of the present invention, an optical transceiver includes a wavelength-tunable transmission unit configured to transmit an optical transmission signal, a wavelength-tunable reception unit configured to receive an optical reception signal, a wavelength table configured to store a plurality of combinations of a transmission wavelength and a reception wavelength, an input terminal configured to input a wavelength selection signal, and a control unit configured to select one combination of the transmission wavelength and the reception wavelength from the wavelength table based on the wavelength selection signal, and perform transmission wavelength control for setting the selected transmission wavelength in the wavelength-tunable transmission unit as a wavelength of the optical transmission signal and reception wavelength control for setting the selected reception wavelength in the wavelength-tunable reception unit as a wavelength of the optical reception signal.

According to a second aspect of the present invention, in the optical transceiver according to the first aspect described above, the wavelength selection signal is input to the input terminal as one or more control pulses, the wavelength table stores each of the plurality of combinations correlated with a respective number of the control pulses, and the control unit selects the one combination of the transmission wavelength and the reception wavelength, which corresponds to the number of the control pulses as the wavelength selection signal, from the wavelength table, and performs the transmission wavelength control and the reception wavelength control.

According to a third aspect of the present invention, in the optical transceiver according to the first aspect described above, the wavelength selection signal is input to the input terminal as a control voltage of any one of a plurality of predetermined voltage values, the wavelength table stores each of the plurality of combinations correlated with a respective voltage value of the plurality of predetermined voltage values, and the control unit selects the one combination of the transmission wavelength and the reception wavelength, which corresponds to the control voltage as the wavelength selection signal, from the wavelength table, and performs the transmission wavelength control and the reception wavelength control.

According to a fourth aspect of the present invention, in the optical transceiver according to the second aspect described above, a transmission control signal determined by a voltage value corresponding to each of transmission and stoppage of the optical transmission signal is input to the input terminal, and the control unit controls the transmission of the optical transmission signal by the wavelength-tunable transmission unit in accordance with the transmission control signal.

According to a fifth aspect of the present invention, in the optical transceiver according to the second or fourth aspect described above, a reset signal instructing initialization for the transmission wavelength and the reception wavelength is input to the input terminal as a predetermined voltage value or a predetermined number of control pulses, and the control unit selects a predetermined combination of the transmission wavelength and the reception wavelength in accordance with the reset signal, and performs the transmission wavelength control and the reception wavelength control.

According to a sixth aspect of the present invention, a control method is a control method in an optical transceiver including a wavelength-tunable transmission unit that transmits an optical transmission signal, a wavelength-tunable reception unit that receives an optical reception signal, a wavelength table that stores a plurality of combinations of a transmission wavelength and a reception wavelength, and an input terminal through which a wavelength selection signal is input, and the control method includes a step of selecting one combination of the transmission wavelength and the reception wavelength from the wavelength table based on the wavelength selection signal, a step of setting the selected transmission wavelength in the wavelength-tunable transmission unit as a wavelength of the optical transmission signal, and a step of setting the selected reception wavelength in the wavelength-tunable reception unit as a wavelength of the optical reception signal.

Advantageous Effects of Invention

According to the present invention, it is possible to decrease the number of terminals used for controlling optical signals that are transmitted and received.

BRIEF DESCRIPTION OF DRAWINGS

FIG. 3 is a diagram illustrating a relationship between the number of pulses of a pulse signal used as a wavelength selection signal and a wavelength pair of transmission/reception wavelengths in the second embodiment.

FIG. 13 is a diagram illustrating a relationship between the control voltage and the wavelength pair according to the sixth embodiment.

FIG. 15 is a diagram illustrating a modification example of a relationship between the control voltage and the wavelength pair according to the sixth embodiment.

FIG. 17 is a diagram illustrating a burst control signal in the seventh embodiment.

DESCRIPTION OF EMBODIMENTS

First Embodiment

Figure 1:
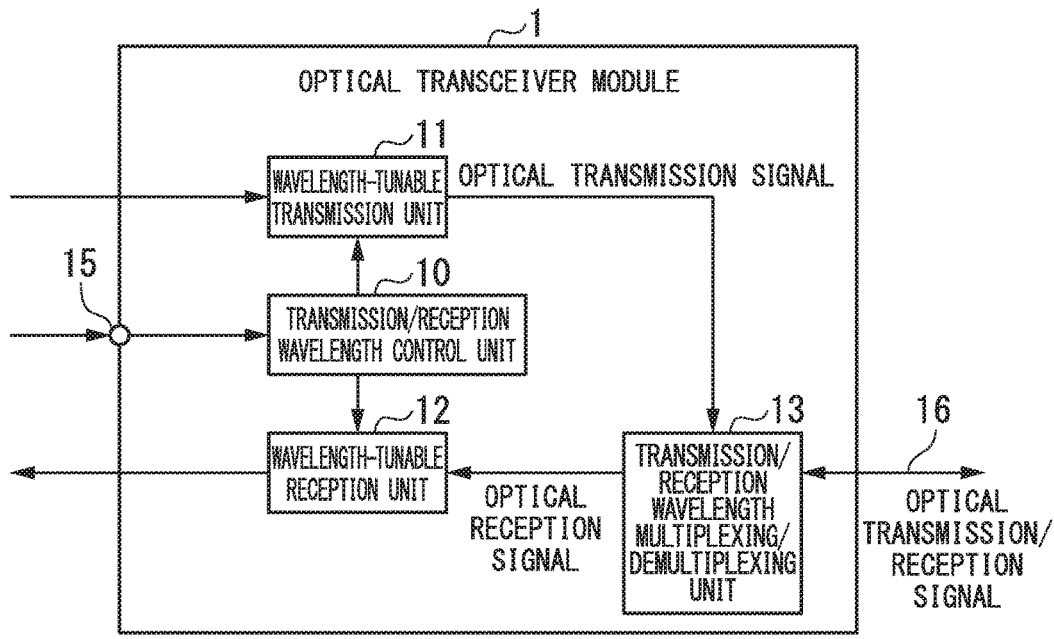
FIG. 1 is a block diagram of an optical transceiver module according to a first embodiment.

FIG. 1 is a block diagram of an optical transceiver module 1 according to a first embodiment. As illustrated in FIG. 1, the optical transceiver module 1 includes a transmission/reception wavelength control unit 10, a wavelength-tunable transmission unit 11, a wavelength-tunable reception unit 12, a transmission/reception wavelength multiplexing/demultiplexing unit 13 and an input terminal 15. The input terminal 15 is connected to the transmission/reception wavelength control unit 10.

A wavelength selection signal is input to the input terminal 15. The transmission/reception wavelength control unit 10 controls a wavelength of an optical transmission signal (a transmission wavelength), which is transmitted from the wavelength-tunable transmission unit 11, and a wavelength of an optical reception signal (a reception wavelength), which is received by the wavelength-tunable reception unit 12, on the basis of the wavelength selection signal from the input terminal 15.

The wavelength-tunable transmission unit 11 converts an electric signal to be transmitted into the optical transmission signal and outputs the optical transmission signal to an optical fiber 16 via the transmission/reception wavelength multiplexing/demultiplexing unit 13. The wavelength-tunable transmission unit 11 can set the wavelength of the optical transmission signal, which is transmitted to the optical fiber 16, to have an arbitrary value under the control of the transmission/reception wavelength control unit 10.

The wavelength-tunable reception unit 12 converts the optical reception signal received from the optical fiber 16 via the transmission/reception wavelength multiplexing/demultiplexing unit 13 into an electric signal and outputs the electric signal. The wavelength-tunable reception unit 12 can set the wavelength of the optical reception signal received from the optical fiber 16 to have an arbitrary value under the control of the transmission/reception wavelength control unit 10.

The transmission/reception wavelength multiplexing/demultiplexing unit 13 multiplexes the optical transmission signal output from the wavelength-tunable transmission unit 11, and transmits the multiplexed signal to another device via the optical fiber 16. Furthermore, the transmission/reception wavelength multiplexing/demultiplexing unit 13 outputs the optical reception signal transmitted by wavelength-division multiplexing via the optical fiber 16 to the wavelength-tunable reception unit 12.

As described above, in the optical transceiver module 1 according to the first embodiment, it is possible to set the transmission wavelength of the wavelength-tunable transmission unit 11 and the reception wavelength of the wavelength-tunable reception unit 12 using the wavelength selection signal input to the input terminal 15. In the optical transceiver module 1, the transmission wavelength and the reception wavelength are set as a fixed wavelength pair, so that it is possible to set the transmission wavelength and the reception wavelength using the wavelength selection signal input to one pin provided to the input terminal 15.

Second Embodiment

Figure 2:
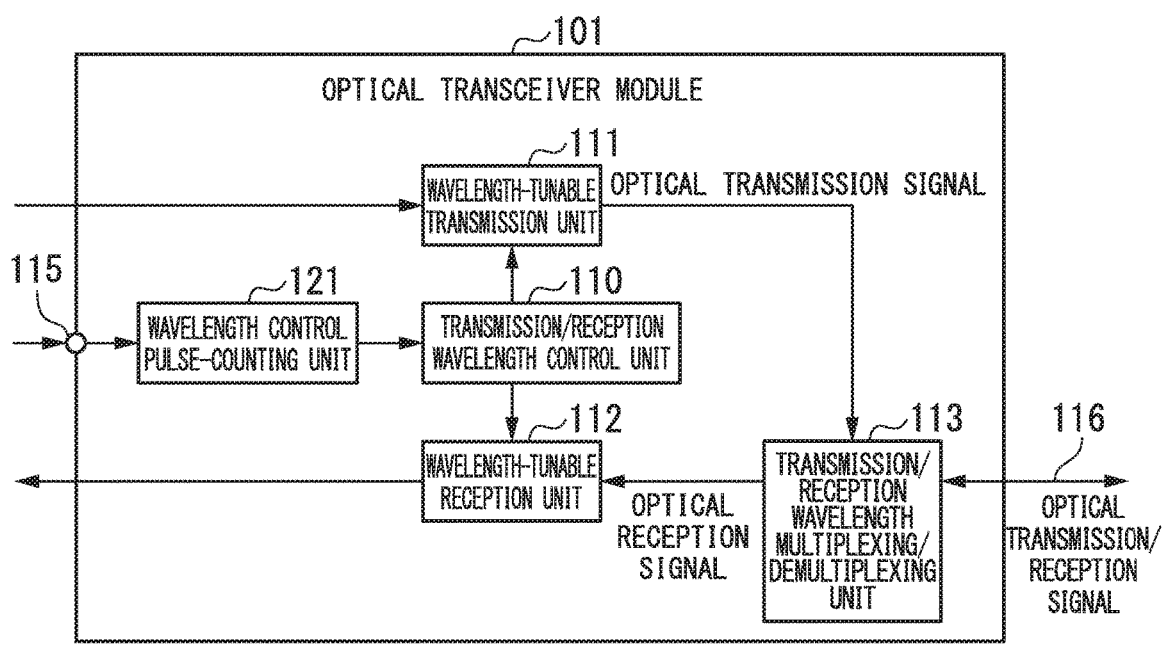
FIG. 2 is a block diagram illustrating a configuration of an optical transceiver module according to a second embodiment.

FIG. 2 is a block diagram illustrating a configuration of an optical transceiver module 101 according to a second embodiment. As illustrated in FIG. 2, the optical transceiver module 101 includes a transmission/reception wavelength control unit 110, a wavelength-tunable transmission unit 111, a wavelength-tunable reception unit 112, a transmission/reception wavelength multiplexing/demultiplexing unit 113, an input terminal 115 and a wavelength control pulse-counting unit 121. The wavelength-tunable transmission unit 111, the wavelength-tunable reception unit 112 and the transmission/reception wavelength multiplexing/demultiplexing unit 113 are similar to the wavelength-tunable transmission unit 11, the wavelength-tunable reception unit 12 and the transmission/reception wavelength multiplexing/demultiplexing unit 13 in FIG. 1. Furthermore, an optical fiber 116 is similar to the optical fiber 16 in FIG. 1.

A pulse signal is supplied to the wavelength control pulse-counting unit 121 as a wavelength selection signal from the input terminal 115. The number of pulses of the pulse signal used as the wavelength selection signal corresponds to a wavelength pair of transmission/reception wavelengths.

FIG. 3 is a diagram illustrating a relationship between the number of pulses of the pulse signal used as the wavelength selection signal and the wavelength pair of the transmission/reception wavelengths. As illustrated in FIG. 3, the number of pulses "1" corresponds to a wavelength pair ($\lambda s1$, $\lambda r1$), the number of pulses "2" corresponds to a wavelength pair ($\lambda s2$, $\lambda r2$), the number of pulses "3" corresponds to a wavelength pair ($\lambda s3$, $\lambda r3$), and the number of pulses "4" corresponds to a wavelength pair ($\lambda s4$, $\lambda r4$). In the following description, $\lambda sn$ (n is an arbitrary integer) denotes a transmission wavelength and $\lambda rn$ (n is an arbitrary integer) denotes a reception wavelength. That is, a wavelength table, in which the number of pulses is correlated with a respective one of a plurality of wavelength pairs, is determined in advance. Different numbers of pulses are correlated with wavelength pairs such that the wavelength pairs can be uniquely selected. The optical transceiver module 101 may include the wavelength table illustrated in FIG. 3. Alternatively, the transmission/reception wavelength control unit 110 may also store the wavelength table illustrated in FIG. 3.

When the wavelength selection signal is supplied to the input terminal 115, the number of pulses of the wavelength selection signal is counted in the wavelength control pulse-counting unit 121. The transmission/reception wavelength control unit 110 sets wavelengths of the wavelength-tunable transmission unit 111 and the wavelength-tunable reception unit 112 in accordance with the number of pulses of the wavelength selection signal counted in the wavelength control pulse-counting unit 121.

For example, when the number of pulses of the wavelength selection signal from the input terminal 115 is "1", the transmission/reception wavelength control unit 110 respectively sets the transmission wavelength of the wavelength-tunable transmission unit 111 and the reception wavelength of the wavelength-tunable reception unit 112 to λs1 and λr1 on the basis of the correspondence relationship of the wavelength table illustrated in FIG. 3. Furthermore, when the number of pulses of the wavelength selection signal from the input terminal 115 is "3", the transmission/reception wavelength control unit 110 respectively sets the transmission wavelength of the wavelength-tunable transmission unit 111 and the reception wavelength of the wavelength-tunable reception unit 112 to λs3 and λr3 on the basis of the correspondence relationship of the wavelength table.

Figure 4:
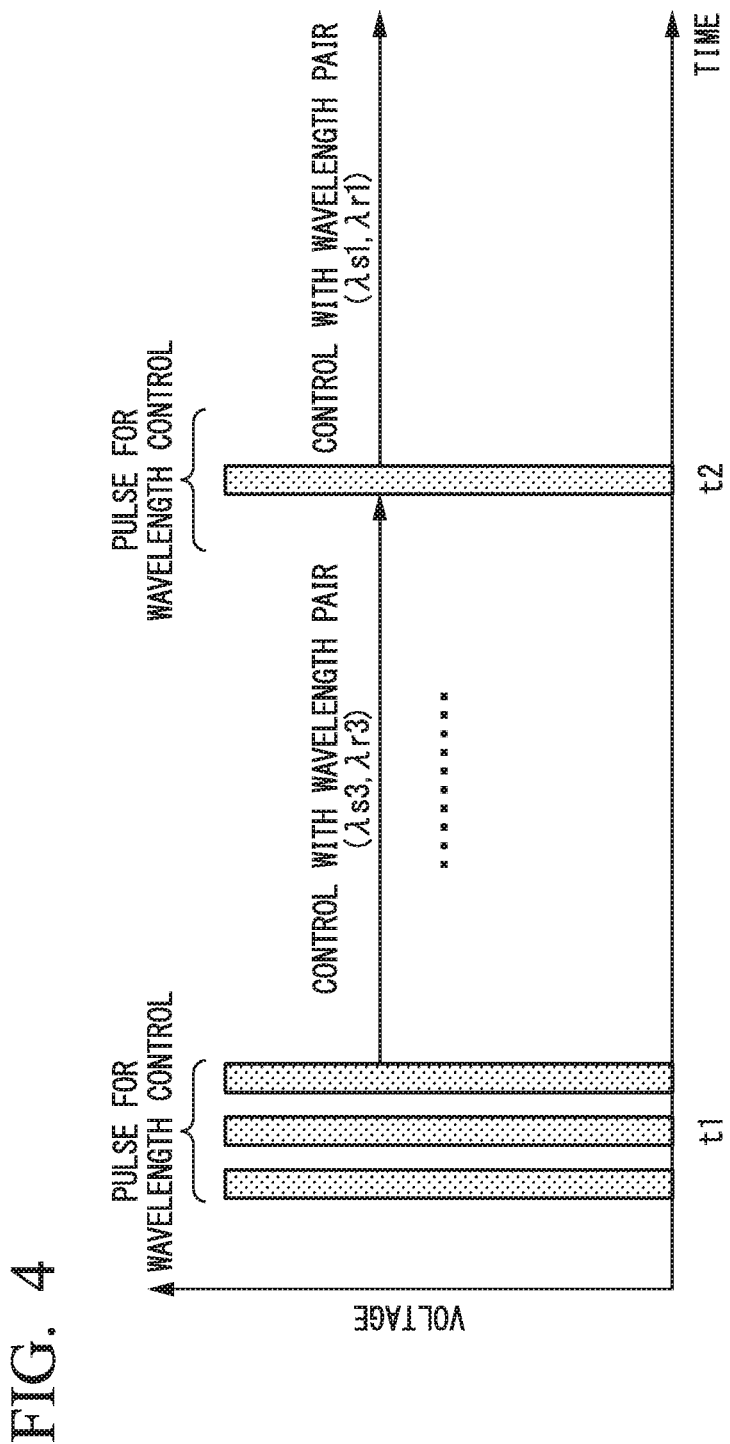
FIG. 4 is a waveform diagram illustrating a relationship between a wavelength selection signal and transmission/reception wavelength setting in the optical transceiver module according to the second embodiment.

FIG. 4 is a waveform diagram illustrating a relationship between a wavelength selection signal and transmission/reception wavelength setting in the optical transceiver module 101 according to the second embodiment. In FIG. 4, a horizontal axis denotes a time and a vertical axis denotes a voltage of the wavelength selection signal input from the input terminal 115.

A pulse signal for wavelength control is supplied to the input terminal 115 as the wavelength selection signal. The number of pulses of the pulse signal for wavelength control is measured in the wavelength control pulse-counting unit 121. As illustrated in FIG. 4, it is assumed that at a time t1, the number of pulses is counted in the wavelength control pulse-counting unit 121 by "3". In this case, the transmission/reception wavelength control unit 110 sets the transmission/reception wavelengths to the wavelength pair (λs3, λr3) on the basis of the correspondence relationship illustrated in FIG. 3. It is assumed that for the wavelength selection signal from the input terminal 115, the number of pulses is counted in the wavelength control pulse-counting unit 121 by "1" at a time t2. In this case, the transmission/reception wavelength control unit 110 sets the transmission/reception wavelengths to the wavelength pair (λs1, λr1) on the basis of the correspondence relationship illustrated in FIG. 3.

As described above, in the optical transceiver module 101 according to the second embodiment, the pulse signal for wavelength control is supplied to the input terminal 115 as the wavelength selection signal of transmission/reception, and the number of pulses of the pulse signal for wavelength control is correlated with the wavelength pair of the transmission/reception wavelengths. The optical transceiver module 101 can set the transmission wavelength and the reception wavelength using the wavelength selection signal input to one pin provided to the input terminal 115. Since the operation for counting the number of pulses in order to select the wavelength pair is easily handled in digital control, design and implementation of the optical transceiver module 101 is facilitated.

Third Embodiment

Figure 5:
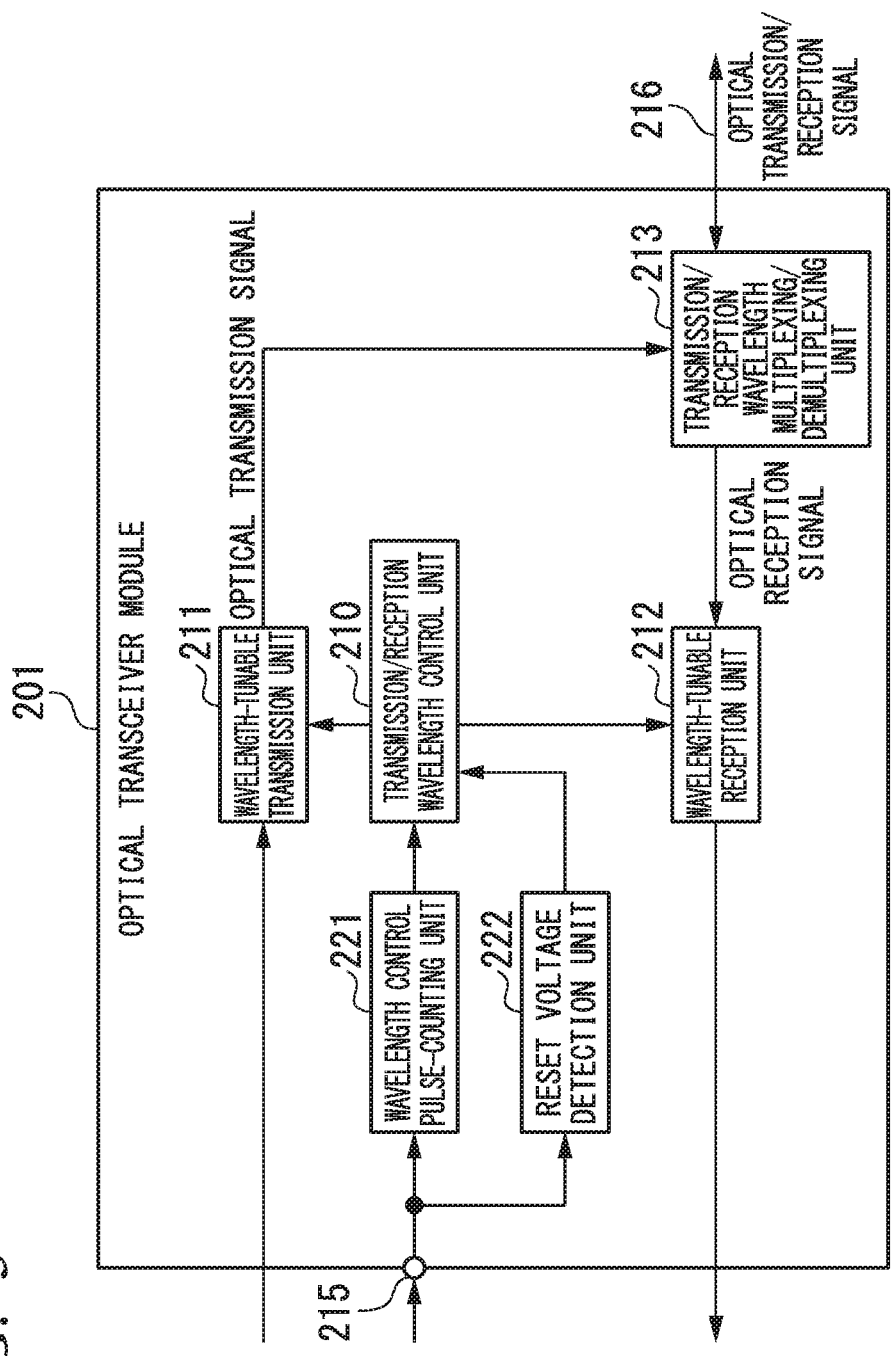
FIG. 5 is a block diagram illustrating a configuration of an optical transceiver module according to a third embodiment.

FIG. 5 is a block diagram illustrating a configuration of an optical transceiver module 201 according to a third embodiment. As illustrated in FIG. 5, the optical transceiver module 201 includes a transmission/reception wavelength control unit 210, a wavelength-tunable transmission unit 211, an input terminal 215, a wavelength-tunable reception unit 212, a transmission/reception wavelength multiplexing/demultiplexing unit 213, a wavelength control pulse-counting unit 221 and a reset voltage detection unit 222. The wavelength-tunable transmission unit 211, the wavelength-tunable reception unit 212 and the transmission/reception wavelength multiplexing/demultiplexing unit 213 are similar to the wavelength-tunable transmission unit 11, the wavelength-tunable reception unit 12 and the transmission/reception wavelength multiplexing/demultiplexing unit 13 in FIG. 1. Furthermore, an optical fiber 216 is similar to the optical fiber 16 in FIG. 1.

The input terminal 215 is a common terminal used for the input of a reset signal and a wavelength selection signal. The reset signal is a control signal for reset having a predetermined voltage. Furthermore, the number of pulses of a pulse signal used as the wavelength selection signal corresponds to a wavelength pair of transmission/reception wavelengths.

Figure 6:
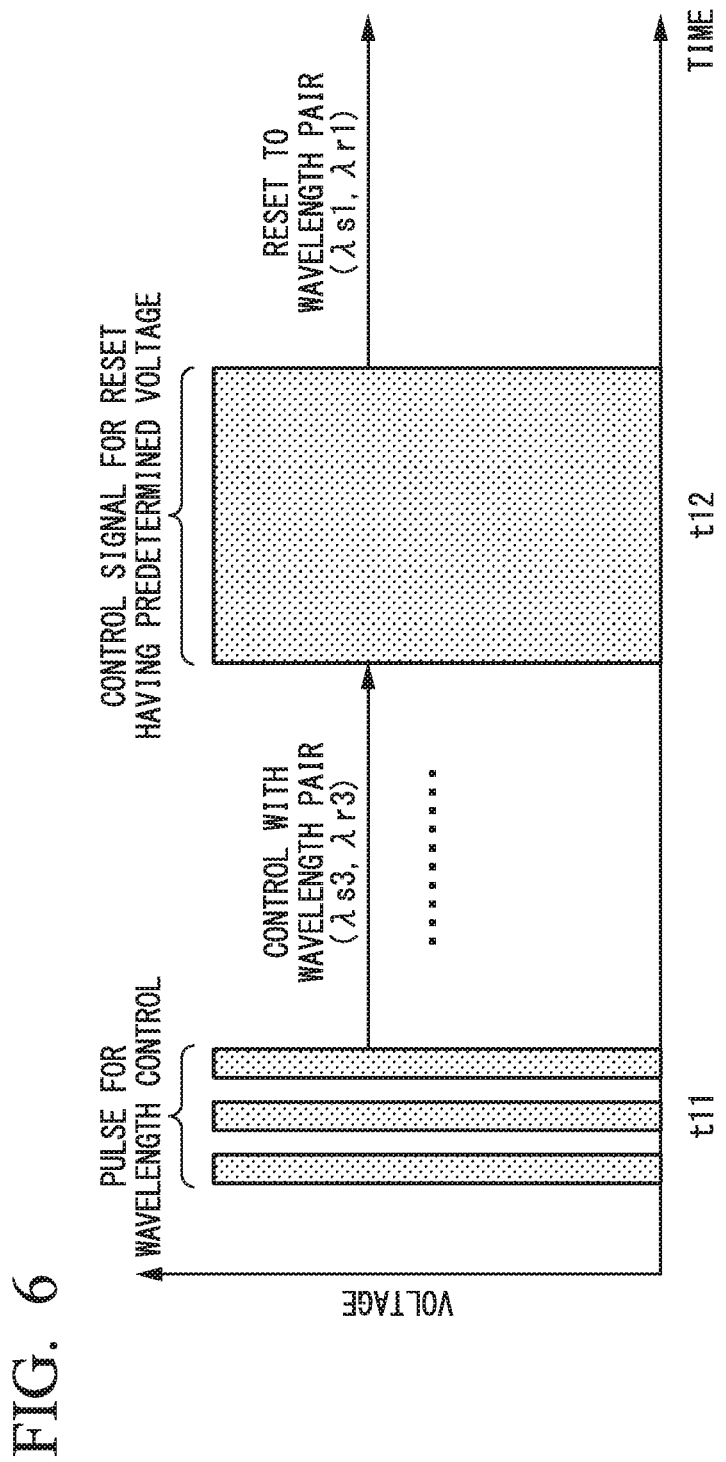
FIG. 6 is a waveform diagram illustrating a relationship between a wavelength selection signal and transmission/reception wavelength setting in the optical transceiver module according to the third embodiment.

FIG. 6 is a waveform diagram illustrating a relationship between the wavelength selection signal and transmission/reception wavelength setting in the optical transceiver module 201 according to the third embodiment. In FIG. 6, a horizontal axis denotes a time and a vertical axis denotes a voltage of a signal input from the input terminal 215.

A pulse signal for wavelength control is supplied to the input terminal 215 as the wavelength selection signal. The number of pulses of the pulse signal for wavelength control is measured in the wavelength control pulse-counting unit 221. Furthermore, the control signal for reset having the predetermined voltage is supplied to the input terminal 215. The control signal for reset having the predetermined voltage is detected by the reset voltage detection unit 222.

As illustrated in FIG. 6, at a time t11, when the pulse signal for wavelength control is supplied to the input terminal 215 as the number of pulses "3", the number of pulses "3" is counted in the wavelength control pulse-counting unit 221. When the number of pulses "3" is counted in the wavelength control pulse-counting unit 221, the transmission/reception wavelength control unit 210 sets the transmission/reception wavelengths to the wavelength pair (λs3, λr3). At a time t12, when the control signal for reset having the predetermined voltage is supplied from the input terminal 215, the control signal for wavelength reset having the predetermined voltage is detected by the reset voltage detection unit 222. When the control signal for reset having the predetermined voltage is detected by the reset voltage detection unit 222, the transmission/reception wavelength control unit 210 resets the transmission/reception wavelengths to the wavelength pair (λs1, λr1). The reset (initialization) is an operation for setting a predetermined wavelength pair in the transmission wavelength and the reception wavelength.

As described above, in the optical transceiver module 201 according to the third embodiment, the pulse signal is supplied to the input terminal 215 as the wavelength selection signal of transmission/reception. Furthermore, the control signal for reset having the predetermined voltage is also supplied to the input terminal 215. In this way, the same input terminal 215 is used for the input of the reset signal and the wavelength selection signal. Accordingly, the optical transceiver module 201 can input the reset signal and the wavelength selection signal without increasing the number of terminals, thus it is possible to further reduce the number of pins of the input terminal 215 to be provided to the optical transceiver module 201.

Fourth Embodiment

Figure 7:
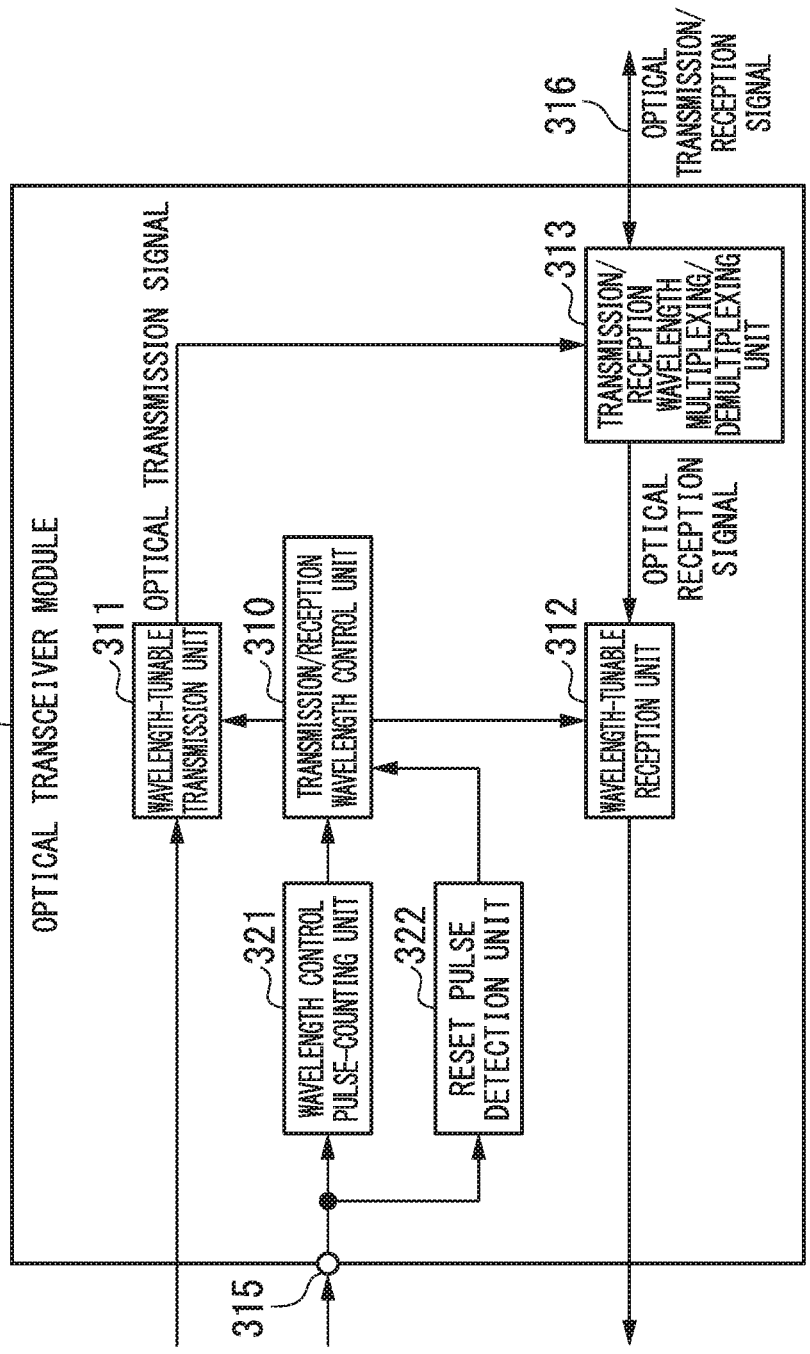
FIG. 7 is a block diagram illustrating a configuration of an optical transceiver module according to a fourth embodiment.

FIG. 7 is a block diagram illustrating a configuration of an optical transceiver module 301 according to a fourth embodiment. As illustrated in FIG. 7, the optical transceiver module 301 includes a transmission/reception wavelength control unit 310, a wavelength-tunable transmission unit 311, a wavelength-tunable reception unit 312, a transmission/reception wavelength multiplexing/demultiplexing unit 313, an input terminal 315, a wavelength control pulse-counting unit 321 and a reset pulse detection unit 322. The transmission/reception wavelength control unit 310, the wavelength-tunable transmission unit 311, the wavelength-tunable reception unit 312 and the transmission/reception wavelength multiplexing/demultiplexing unit 313 are similar to the transmission/reception wavelength control unit 10, the wavelength-tunable transmission unit 11, the wavelength-tunable reception unit 12 and the transmission/reception wavelength multiplexing/demultiplexing unit 13 in FIG. 1. Furthermore, an optical fiber 316 is similar to the optical fiber 16 in FIG. 1.

The input terminal 315 is a common terminal used for the input of a reset signal and a wavelength selection signal. The reset signal is a pulse signal having a predetermined number of pulses. Furthermore, the number of pulses of the pulse signal used as the wavelength selection signal corresponds to the wavelength pair of the transmission/reception wavelengths in the wavelength table illustrated in FIG. 3.

Figure 8:
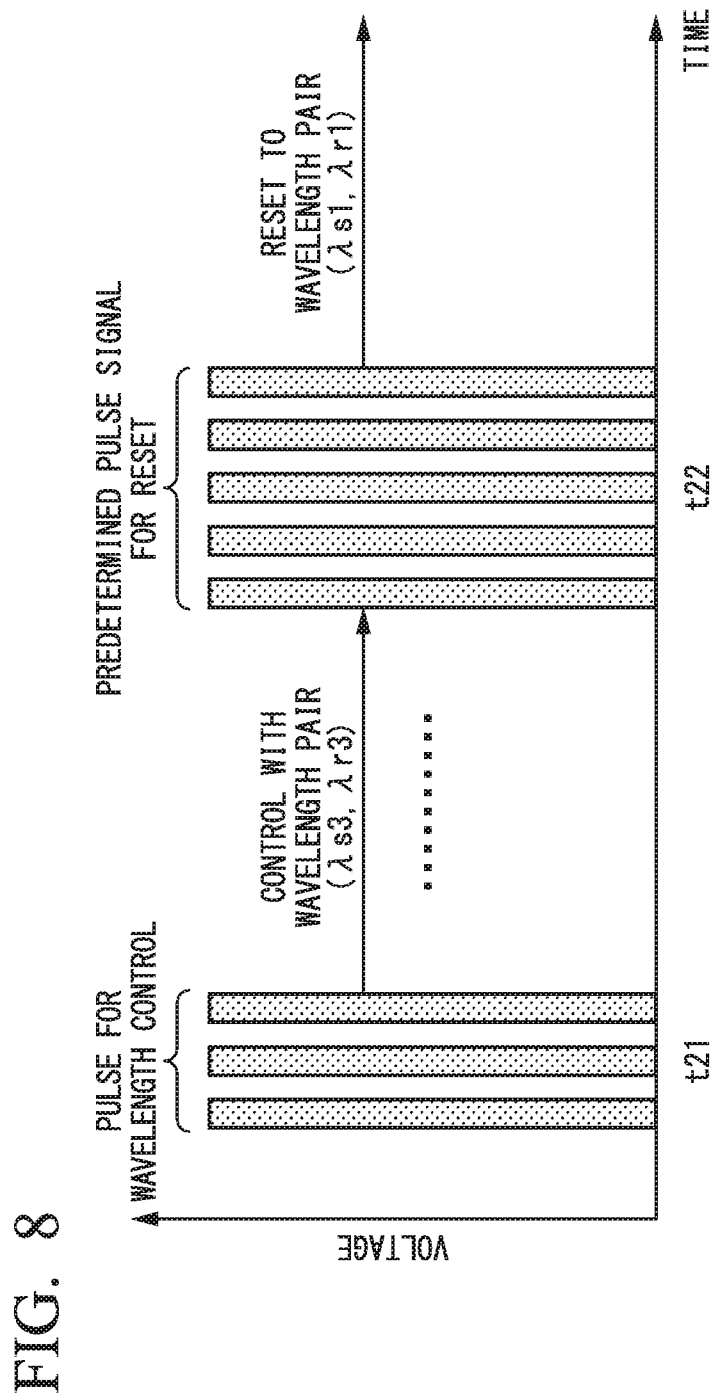
FIG. 8 is a waveform diagram illustrating a relationship between a wavelength selection signal and transmission/reception wavelength setting in the optical transceiver module according to the fourth embodiment.

FIG. 8 is a waveform diagram illustrating a relationship between a wavelength selection signal and transmission/reception wavelength setting in the optical transceiver module 301 according to the fourth embodiment. In FIG. 8, a horizontal axis denotes a time and a vertical axis denotes a voltage of a signal input from the input terminal 315.

A pulse signal for wavelength control is supplied to the input terminal 315 as the wavelength selection signal. The number of pulses of the pulse signal for wavelength control is measured in the wavelength control pulse-counting unit 321. Furthermore, a pulse signal for wavelength reset is supplied to the input terminal 315. The pulse signal for wavelength reset is detected by the reset pulse detection unit 322.

As illustrated in FIG. 8, at a time t21, when the pulse signal for wavelength control is supplied to the input terminal 315 by the number of pulses "3", the number of pulses "3" is counted in the wavelength control pulse-counting unit 321. When the number of pulses "3" is counted in the wavelength control pulse-counting unit 321, the transmission/reception wavelength control unit 310 sets the transmission/reception wavelengths to the wavelength pair ($\lambda s3$, $\lambda r3$). At a time t22, when the pulse signal for wavelength reset is supplied from the input terminal 315, the pulse signal for wavelength reset is detected by the reset pulse detection unit 322. When the pulse signal for wavelength reset is detected by the reset pulse detection unit 322, the transmission/reception wavelength control unit 310 resets the transmission/reception wavelengths to the wavelength pair ($\lambda s1$, $\lambda r1$).

As described above, in the optical transceiver module 301 according to the fourth embodiment, the pulse signal is supplied to the input terminal 315 as the wavelength selection signal of transmission/reception. Furthermore, the pulse signal for reset having the predetermined number of pulses is also supplied to the input terminal 315. In this way, the input terminal 315 is used for the input of the reset signal and the wavelength selection signal. Accordingly, the optical transceiver module 301 can input the reset signal and the wavelength selection signal without increasing the number of terminals, thus it is possible to further reduce the number of pins of the input terminal 315 to be provided to the optical transceiver module 301.

Fifth Embodiment

Figures 9, 10:
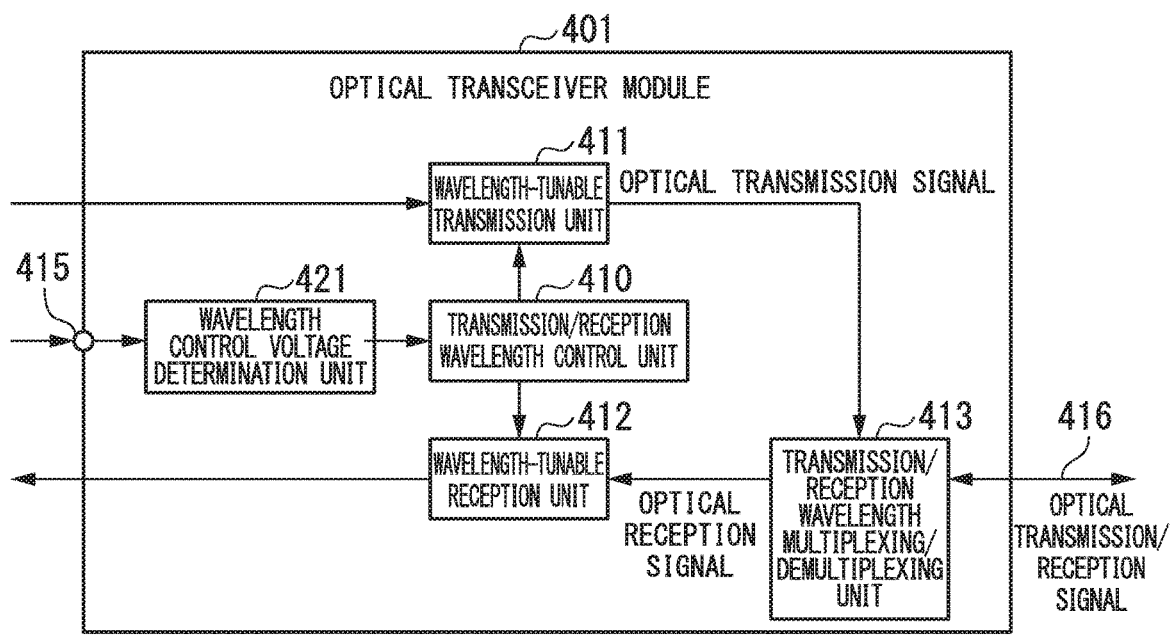
FIG. 9 is a block diagram illustrating a configuration of an optical transceiver module according to a fifth embodiment.
FIG. 10 is a diagram illustrating a relationship between a wavelength control voltage used as a wavelength selection signal and a transmission/reception wavelength pair in the fifth embodiment.

FIG. 9 is a block diagram illustrating a configuration of an optical transceiver module 401 according to a fifth embodiment. As illustrated in FIG. 9, the optical transceiver module 401 includes a transmission/reception wavelength control unit 410, a wavelength-tunable transmission unit 411, a wavelength-tunable reception unit 412, a transmission/reception wavelength multiplexing/demultiplexing unit 413, an input terminal 415 and a wavelength control voltage determination unit 421. The wavelength-tunable transmission unit 411, the wavelength-tunable reception unit 412 and the transmission/reception wavelength multiplexing/demultiplexing unit 413 are similar to the wavelength-tunable transmission unit 11, the wavelength-tunable reception unit 12 and the transmission/reception wavelength multiplexing/demultiplexing unit 13 in FIG. 1. Furthermore, an optical fiber 416 is similar to the optical fiber 16 in FIG. 1.

A wavelength control voltage is supplied to the wavelength control voltage determination unit 421 as a wavelength selection signal from the input terminal 415. The value of the wavelength control voltage used as the wavelength selection signal corresponds to a wavelength pair.

FIG. 10 is a diagram illustrating a relationship between the wavelength control voltage used as the wavelength selection signal and a transmission/reception wavelength pair. As illustrated in FIG. 10, a control voltage V1 corresponds to a wavelength pair ($\lambda s1$, $\lambda r1$), a control voltage V2 corresponds to a wavelength pair ($\lambda s2$, $\lambda r2$), a control voltage V3 corresponds to a wavelength pair ($\lambda s3$, $\lambda r3$), and a control voltage V4 corresponds to a wavelength pair ($\lambda s4$, $\lambda r4$). That is, a wavelength table, in which a control voltage value is correlated with each of a plurality of wavelength pairs, is determined in advance. Different control voltage values are correlated with the wavelength pairs such that the wavelength pairs can be uniquely selected. The optical transceiver module 401 may include the wavelength table illustrated in FIG. 10. Alternatively, the transmission/reception wavelength control unit 410 may also store the wavelength table illustrated in FIG. 10.

When the wavelength selection signal is supplied to the input terminal 415, the voltage value of the wavelength control voltage supplied as the wavelength selection signal is measured in the wavelength control voltage determination unit 421. The transmission/reception wavelength control unit 410 sets transmission/reception wavelengths in accordance with the voltage value of the wavelength control voltage.

For example, when the voltage value of the wavelength selection signal from the input terminal 415 is "V1", the transmission/reception wavelength control unit 410 sets the transmission/reception wavelengths to the wavelength pair ($\lambda s1$, $\lambda r1$) on the basis of the correspondence relationship of the wavelength table illustrated in FIG. 10. Furthermore, when the voltage value of the wavelength selection signal from the input terminal 415 is "V3", the transmission/reception wavelength control unit 410 sets the transmission/reception wavelengths to the wavelength pair ($\lambda s3$, $\lambda r3$) on the basis of the correspondence relationship of the wavelength table.

As described above, in the optical transceiver module 401 according to the fifth embodiment, the control voltage for wavelength control is supplied to the input terminal 415 as the wavelength selection signal of transmission/reception. The voltage value of the control voltage for wavelength control is correlated with the wavelength pair of transmission/reception. The optical transceiver module 401 can set the transmission wavelength and the reception wavelength by the wavelength selection signal input to one pin provided to the input terminal 415. The voltage measurement in the wavelength control voltage determination unit 421 is performed in a relatively short time, thus the optical transceiver module 401 can improve quick response for the wavelength selection signal.

Sixth Embodiment

Figure 11:
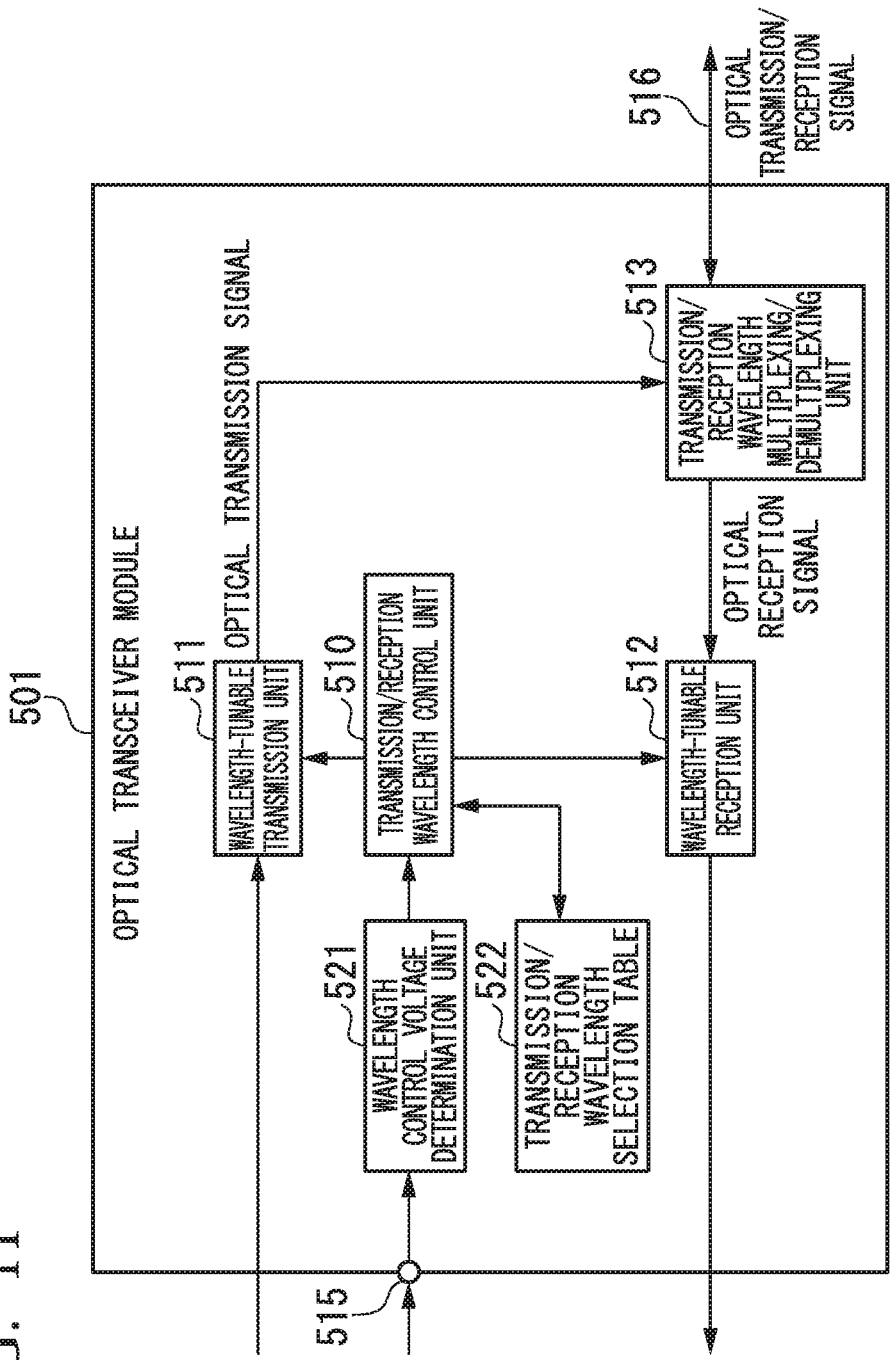
FIG. 11 is a block diagram illustrating a configuration of an optical transceiver module according to a sixth embodiment.

FIG. 11 is a block diagram illustrating a configuration of an optical transceiver module 501 according to a sixth embodiment. As illustrated in FIG. 11, the optical transceiver module 501 includes a transmission/reception wavelength control unit 510, a wavelength-tunable transmission unit 511, a wavelength-tunable reception unit 512, a transmission/reception wavelength multiplexing/demultiplexing unit 513, an input terminal 515, a wavelength control voltage determination unit 521 and a transmission/reception wavelength selection table 522. The wavelength-tunable transmission unit 511, the wavelength-tunable reception unit 512 and the transmission/reception wavelength multiplexing/demultiplexing unit 513 are similar to the wavelength-tunable transmission unit 11, the wavelength-tunable reception unit 12 and the transmission/reception wavelength multiplexing/demultiplexing unit 13 in FIG. 1. Furthermore, an optical fiber 516 is similar to the optical fiber 16 in FIG. 1.

A wavelength control voltage is supplied to the wavelength control voltage determination unit 521 as a wavelength selection signal from the input terminal 515. The value of the wavelength control voltage used as the wavelength selection signal corresponds to a wavelength pair. The transmission/reception wavelength selection table 522 may be included in the optical transceiver module 501 and may be connected to an exterior.

Figure 12:
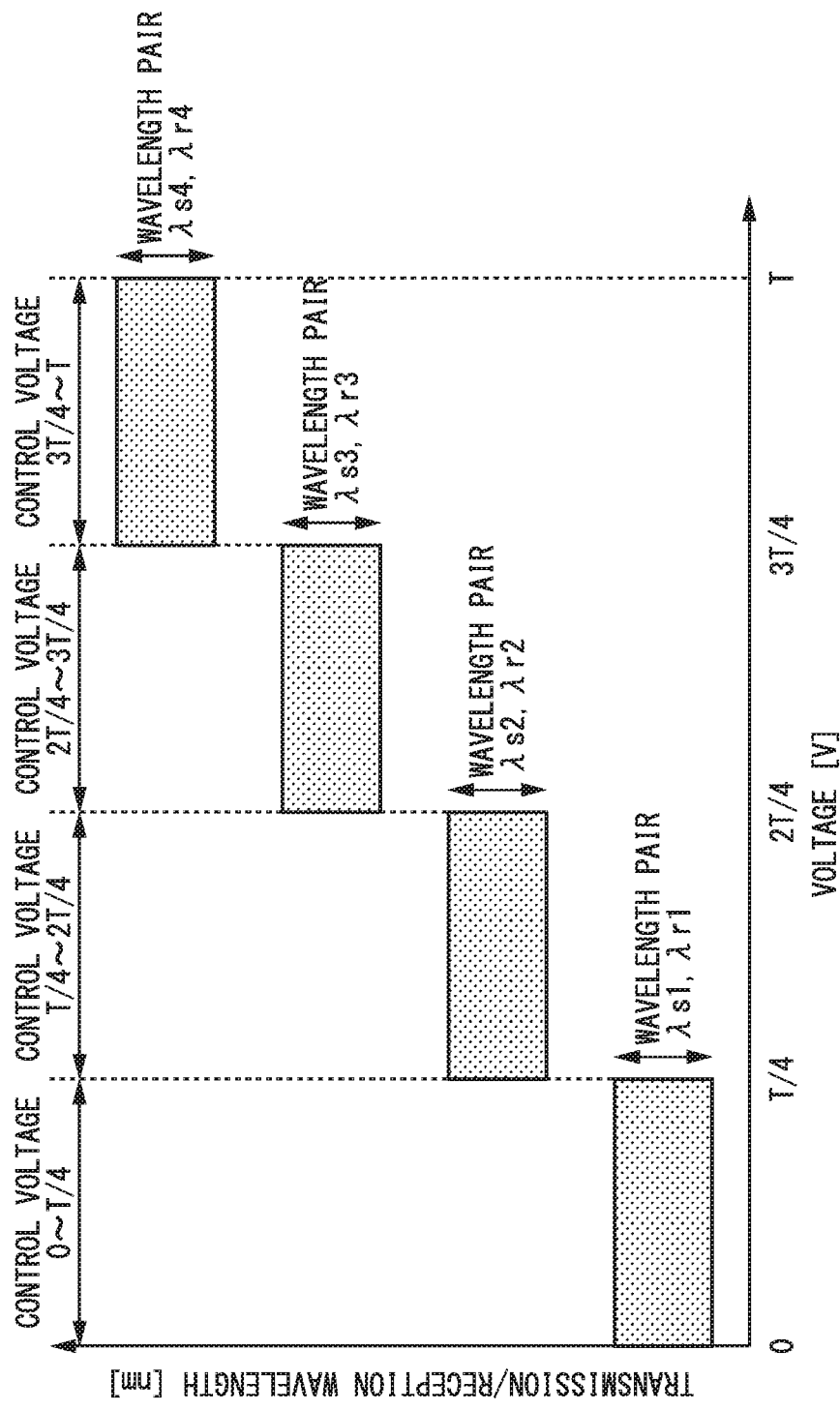
FIG. 12 is a diagram illustrating a relationship between a control voltage and a wavelength pair according to the sixth embodiment.

FIG. 12 and FIG. 13 are diagrams illustrating a relationship between a control voltage and a wavelength pair. As illustrated in FIG. 12, a control voltage from "0" to "T/4" (T is a maximum control voltage) is a control voltage of a wavelength pair ($\lambda s1$, $\lambda r1$). A control voltage from "T/4" to "2T/4" is a control voltage of a wavelength pair ($\lambda s2$, $\lambda r2$). A control voltage from "2T/4" to "3T/4" is a control voltage of a wavelength pair ($\lambda s3$, $\lambda r3$). A control voltage from "3T/4" to "T" is a control voltage of a wavelength pair ($\lambda s4$, $\lambda r4$). As illustrated in FIG. 13, the relationship between the control voltage and the wavelength to be set in each wavelength pair is written in advance in the transmission/reception wavelength selection table 522 as a wavelength table.

When the wavelength selection signal is supplied to the input terminal 515, the control voltage of the wavelength selection signal is detected in the wavelength control voltage determination unit 521. From the detected voltage, wavelength pairs of transmission/reception wavelengths are determined with reference to the transmission/reception wavelength selection table 522 stored with the relationship as illustrated in FIG. 13.

For example, it is assumed that the value of the control voltage of the wavelength selection signal from the input terminal 515 is in the range of "0" to "T/4". In this case, the transmission/reception wavelength control unit 510 sets the transmission/reception wavelengths to the wavelength pair ($\lambda s1$, $\lambda r1$) with reference to the transmission/reception wavelength selection table 522. Furthermore, it is assumed that the value of the control voltage of the wavelength selection signal from the input terminal 515 is in the range of "2T/4" to "3T/4". In this case, the transmission/reception wavelength control unit 510 sets the transmission/reception wavelengths to the wavelength pair ($\lambda s3$, $\lambda r3$) with reference to the transmission/reception wavelength selection table 522.

Figure 14:
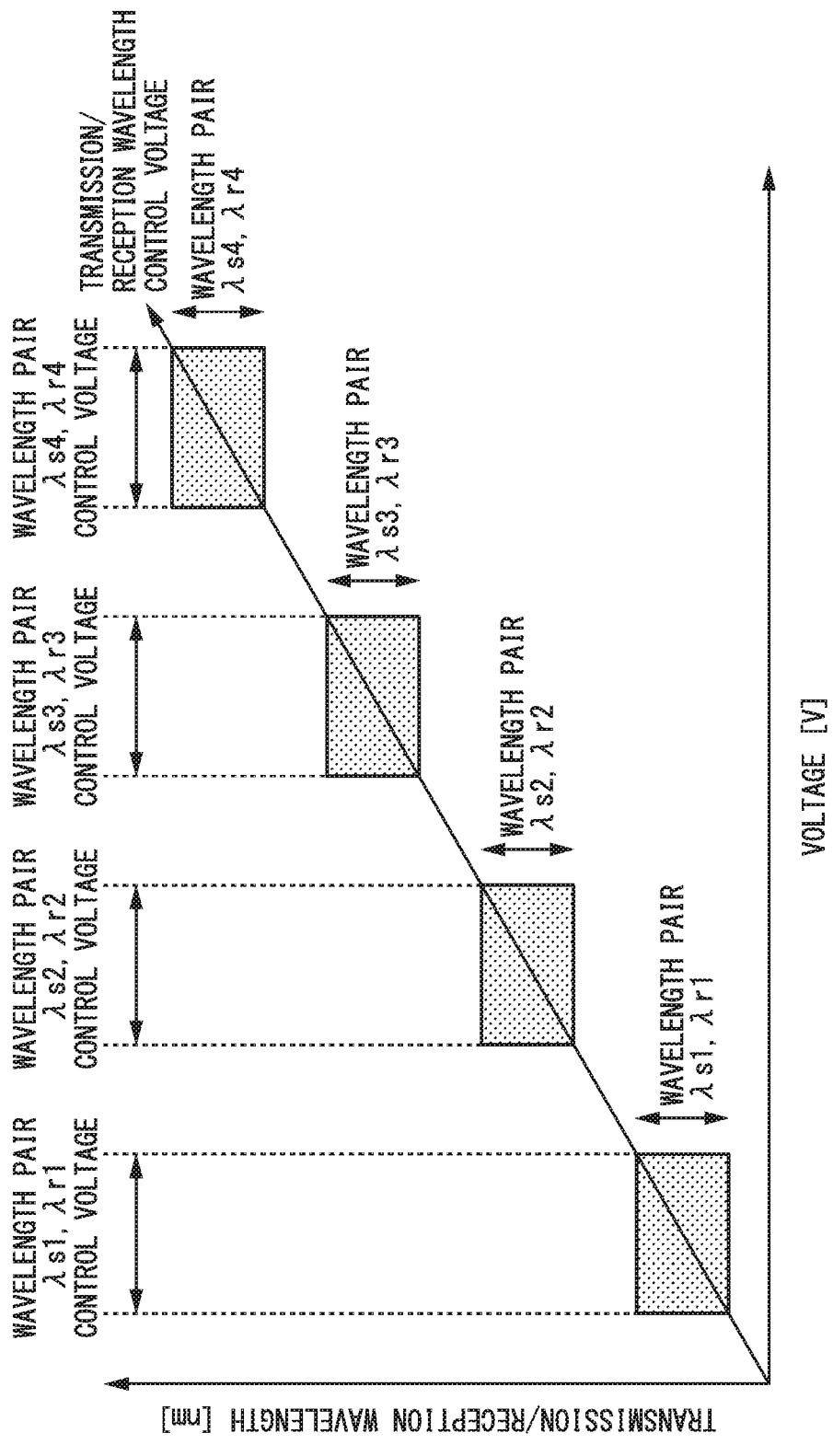
FIG. 14 is a diagram illustrating a modification example of a relationship between a control voltage and a wavelength pair according to a sixth embodiment.

It is to be noted that the correspondence relationship of the wavelength pair to the control voltage may be discretely set or continuously set. FIG. 14 and FIG. 15 are diagrams illustrating a modification example of the relationship between the control voltage and the wavelength pair. In the example of FIG. 12, the range of the control voltage is continuously set, but the control voltage may be discretely set and the control voltage and the wavelength pair may be related to each other as illustrated in FIG. 14.

Furthermore, the wavelength pair when the control voltage is "0" may be determined. That is, the example of FIG. 13 indicates the relationship in which the wavelength pair is set in correspondence to a state in which a predetermined control voltage has been applied as the wavelength selection signal. In contrast, in the example of FIG. 15, the wavelength pair when the control voltage is "0", that is, when no wavelength selection signal is applied, is determined. As described above, the wavelength when the control voltage is "0" is determined, so that it is possible to avoid that the wavelength pair is undetermined when no wavelength selection signal is applied. Furthermore, it is possible to easily reset set wavelengths.

As described above, in the optical transceiver module 501 according to the sixth embodiment, control voltages corresponding to wavelength pairs of transmission/reception wavelengths are used in the input terminal 515. The transmission/reception wavelength selection table 522 stores in advance the relationship between the control voltage and the wavelength pair. The optical transceiver module 501 can set the transmission wavelength and the reception wavelength using the wavelength control signal input to one pin provided to the input terminal 515. The voltage measurement in the wavelength control voltage determination unit 521 is performed in a relatively short time, thus the optical transceiver module 501 can improve quick response for the wavelength selection signal.

Seventh Embodiment

Figure 16:
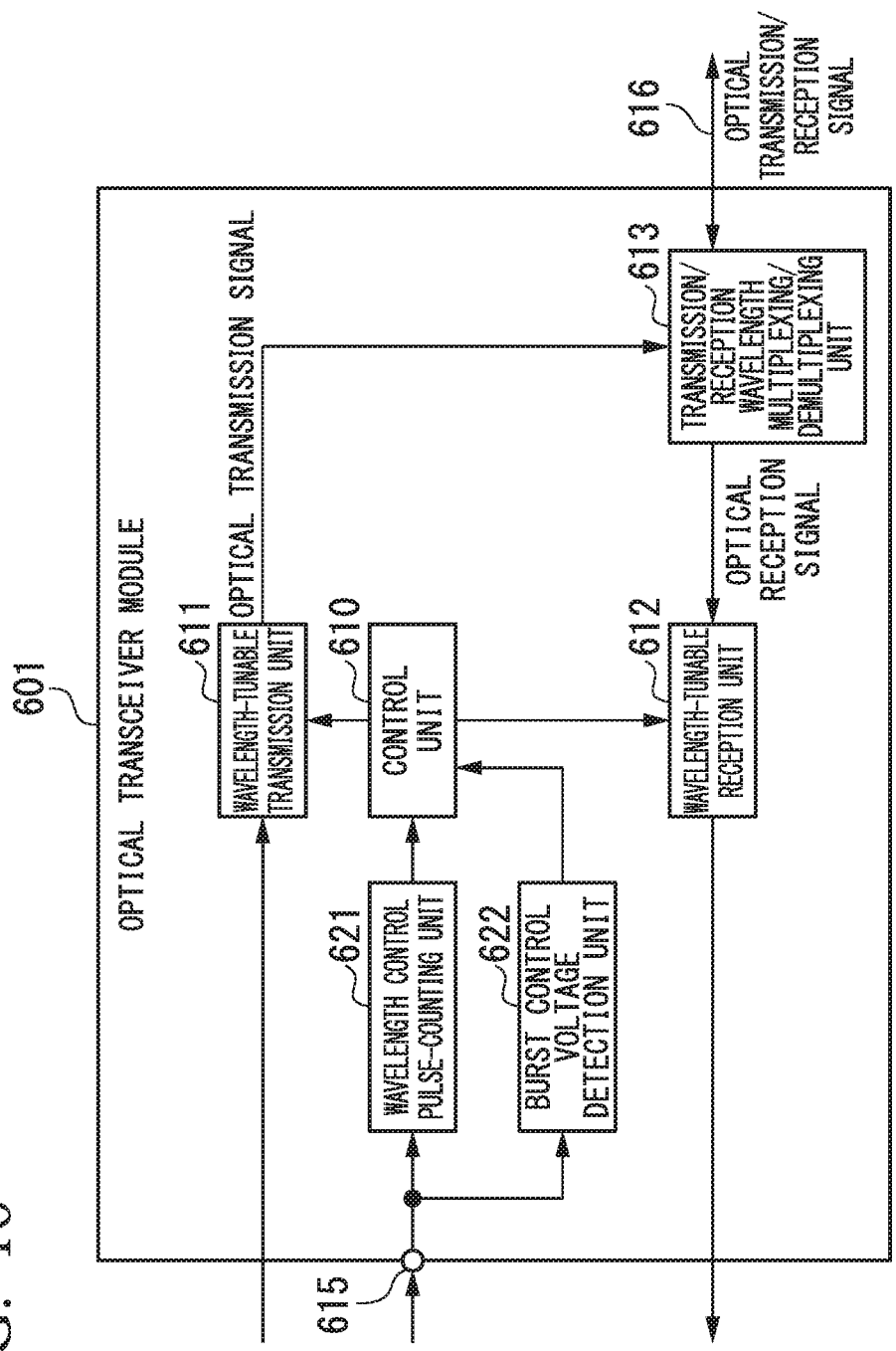
FIG. 16 is a block diagram illustrating a configuration of an optical transceiver module according to a seventh embodiment.

FIG. 16 is a block diagram illustrating a configuration of an optical transceiver module 601 according to a seventh embodiment. The optical transceiver module 601 includes a control unit 610, a wavelength-tunable transmission unit 611, a wavelength-tunable reception unit 612, a transmission/reception wavelength multiplexing/demultiplexing unit 613, an input terminal 615, a wavelength control pulse-counting unit 621 and a burst control voltage detection unit 622. The optical transceiver module 601 switches output and stoppage of an optical transmission signal as well as switching a wavelength of an optical transmission signal and a wavelength of an optical reception signal in accordance with a signal input to the input terminal 615. In the optical transceiver module 601, a burst control signal and a wavelength selection signal are input to the input terminal 615. The burst control signal is a transmission control signal that switches the output and the stoppage of the optical transmission signal. The wavelength selection signal instructs switching of a transmission wavelength and a reception wavelength.

The optical transceiver module 601 transmits/receives an optical signal to/from another device via an optical fiber 616 connected to the transmission/reception wavelength multiplexing/demultiplexing unit 613. The wavelength-tunable transmission unit 611, the wavelength-tunable reception unit 612 and the transmission/reception wavelength multiplexing/demultiplexing unit 613 perform the same operations as those of the wavelength-tunable transmission unit 11, the wavelength-tunable reception unit 12 and the transmission/reception wavelength multiplexing/demultiplexing unit 13 in the first embodiment. Furthermore, the optical fiber 616 is similar to the optical fiber 16 in FIG. 1.

The input terminal 615 is a terminal having one pin. A signal input to the input terminal 615 is supplied to the wavelength control pulse-counting unit 621 and the burst control voltage detection unit 622.

The wavelength control pulse-counting unit 621 counts the number of control pulses in the signal input to the input terminal 615. The wavelength control pulse-counting unit 621 outputs a signal indicating the counted number of pulses to the control unit 610. The wavelength control pulse-counting unit 621 counts a pulse having predetermined pulse width and voltage value. When the pulse having the predetermined pulse width and voltage value is detected, the wavelength control pulse-counting unit 621 may start to count the number of pulses. When a voltage value of the signal input to the input terminal 615 is constant over a predetermined period, the wavelength control pulse-counting unit 621 may determine that the input of a pulse to be counted has been ended.

The burst control voltage detection unit 622 measures the voltage value of the signal input to the input terminal 615, and determines whether a burst control signal is input on the basis of the measurement result. The burst control signal includes a burst-enable signal and a burst-disable signal.

FIG. 17 is a diagram illustrating the burst control signal in the seventh embodiment. The burst-enable signal is a signal that instructs output (ON) of an optical transmission signal when a control voltage value is at a high level, and instructs stoppage (OFF) of the optical transmission signal when the control voltage value is at a low level. The burst-disable signal is a signal that instructs the stoppage (OFF) of the optical transmission signal when the control voltage value is at a high level, and instructs the output (ON) of the optical transmission signal when the control voltage value is at a low level. In the optical transceiver module 601, a predetermined one of the burst-enable signal and the burst-disable signal is used as the burst control signal.

The high-level and low-level voltage values of the control voltage are predetermined voltage values and it is sufficient if the burst control voltage detection unit 622 can distinguish the high-level and the low-level voltage values from each other. The high-level and low-level voltage values of the burst control signal may be identical to an upper limit value and a lower limit value of a voltage value used in the control pulse of the wavelength selection signal, or may be different from the upper limit value and the lower limit value. A voltage higher than the upper limit value of the voltage of the control pulse is allocated to the high level of the burst control signal, so that the burst control voltage detection unit 622 can easily distinguish the burst control signal and the wavelength selection signal from each other.

The burst control voltage detection unit 622 determines whether the output of the optical transmission signal has been instructed, on the basis of the measurement result of the voltage value. When it is determined that the output of the optical transmission signal has been instructed, the burst control voltage detection unit 622 outputs a signal instructing the transmission of the optical transmission signal to the control unit 610. When it is determined that the output of the optical transmission signal has not been instructed, the burst control voltage detection unit 622 outputs a signal instructing the stoppage of the optical transmission signal to the control unit 610.

After the wavelength control pulse-counting unit 621 determines that the input of a pulse to be counted has been ended, the burst control voltage detection unit 622 may determine whether the output of the optical transmission signal has been instructed. When the determination is performed as above, it is possible to prevent the burst control voltage detection unit 622 from outputting a signal to the control unit 610 in a period in which the control pulse is input, thereby stabilizing control for the transmission of the optical transmission signal.

The control unit 610 selects a wavelength pair on the basis of a signal input from the wavelength control pulse-counting unit 621. The wavelength pair is a combination of a transmission wavelength of an optical transmission signal output from the wavelength-tunable transmission unit 611 and a reception wavelength of an optical reception signal received by the wavelength-tunable reception unit 612. Similarly to the transmission/reception wavelength control unit 110 of the second embodiment, the control unit 610 includes the wavelength table (FIG. 3) indicating correspondence of the number of pulses and the wavelength pair. The wavelength table may be provided outside the control unit 610. The control unit 610 selects a wavelength pair correlated with the number of pulses indicated by an input signal from the wavelength table. The control unit 610 performs transmission wavelength control and causes the wavelength-tunable transmission unit 611 to transmit an optical transmission signal having the set transmission wavelength. In the transmission wavelength control, the control unit 610 sets a transmission wavelength included in the selected wavelength pair in the wavelength-tunable transmission unit 611 as a wavelength of the optical transmission signal. The control unit 610 performs reception wavelength control and causes the wavelength-tunable reception unit 612 to receive an optical reception signal having the set reception wavelength. In the reception wavelength control, the control unit 610 sets a reception wavelength included in the selected wavelength pair in the wavelength-tunable reception unit 612 as a wavelength of the optical reception signal.

The control unit 610 performs control for switching the output and the stoppage of the optical transmission signal using the wavelength-tunable transmission unit 611 on the basis of the signal output from the burst control voltage detection unit 622. When the signal instructing the transmission of the optical transmission signal is output from the burst control voltage detection unit 622, the control unit 610 causes the wavelength-tunable transmission unit 611 to output the optical transmission signal. When the signal instructing the stoppage of the optical transmission signal is output from the burst control voltage detection unit 622, the control unit 610 causes the wavelength-tunable transmission unit 611 to stop the output of the optical transmission signal. Even when the signal instructing the transmission of the optical transmission signal is not output from the burst control voltage detection unit 622, the control unit 610 may cause the wavelength-tunable transmission unit 611 to stop the output of the optical transmission signal.

Figure 18:
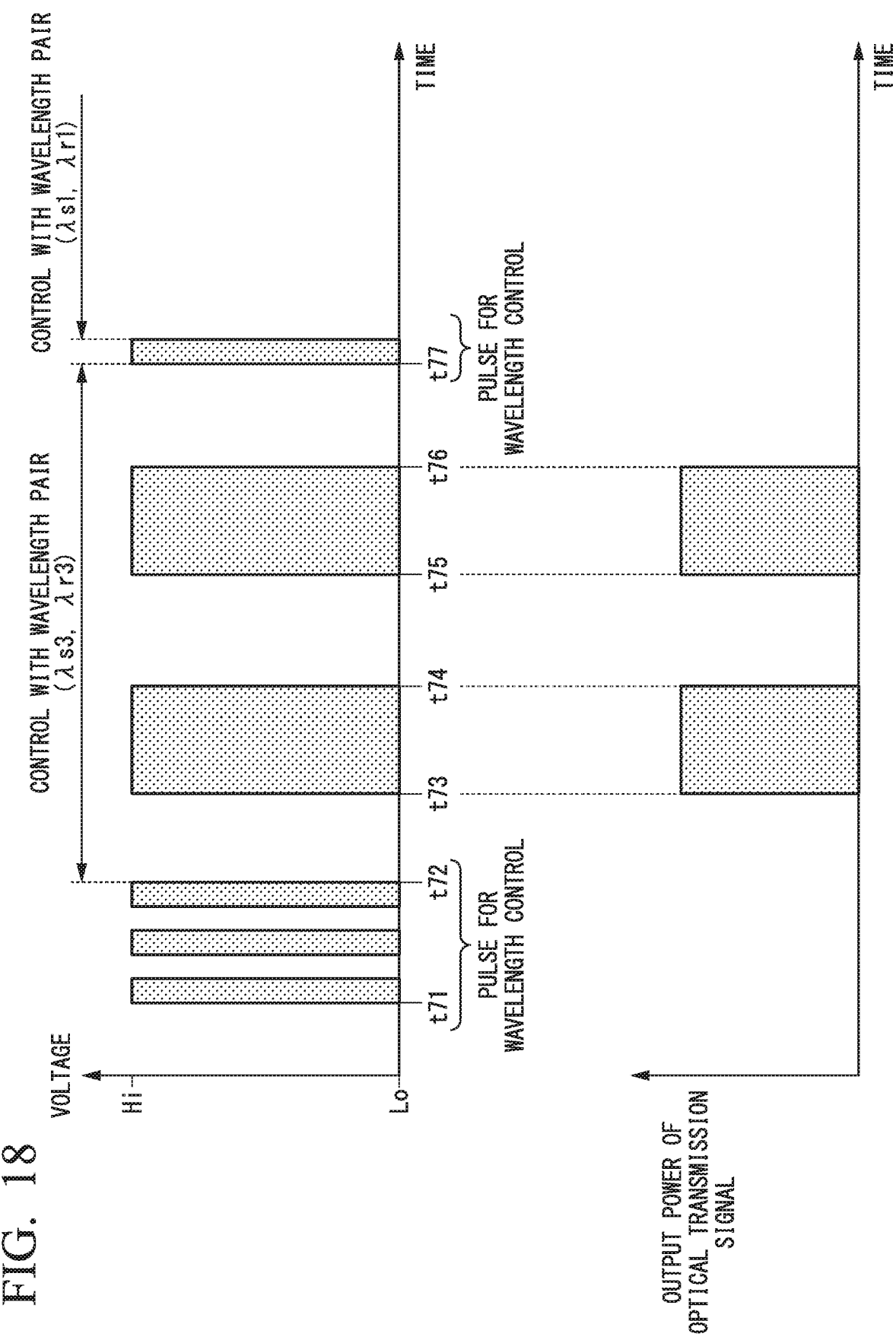
FIG. 18 is a waveform diagram illustrating an example of a relationship between a signal input to an input terminal and an optical transmission signal in the seventh embodiment.

FIG. 18 is a waveform diagram illustrating an example of a relationship between a signal input to the input terminal 615 and an optical transmission signal in the seventh embodiment. In FIG. 18, a vertical axis denotes a voltage of the signal input to the input terminal 615 and output power of the optical transmission signal output from the optical transceiver module 601. A horizontal axis denotes a time. The example illustrated in FIG. 18 is an example in which the burst-enable signal is used as the burst control signal.

In a period from a time t71 to a time t72, three control pulses are input to the input terminal 615. The wavelength control pulse-counting unit 621 counts the number of control pulses in the signal input to the input terminal 615 and outputs a signal indicating the number of pulses "3" to the control unit 610. The control unit 610 selects the wavelength pair (λs3, λr3) corresponding to the number of pulses "3" indicated by the signal from the wavelength table. The control unit 610 sets the wavelength λs3 in the wavelength-tunable transmission unit 611 as a transmission wavelength, and sets the wavelength λr3 in the wavelength-tunable reception unit 612 as a reception wavelength.

At a time t73 after the input of the control pulses is completed, a high-level control voltage is input to the input terminal 615. The burst control voltage detection unit 622 determines that the voltage value of the signal input from the input terminal 615 is at a high level, and outputs a signal instructing the transmission of an optical transmission signal to the control unit 610. The control unit 610 causes the wavelength-tunable transmission unit 611 to output the optical transmission signal having the transmission wavelength λs3 in accordance with the signal output from the burst control voltage detection unit 622.

At a time t74, a low-level control voltage is input to the input terminal 615. The burst control voltage detection unit 622 determines that the voltage value of the signal input from the input terminal 615 is at a low level, and outputs a signal instructing the stoppage of an optical transmission signal to the control unit 610. The control unit 610 causes the wavelength-tunable transmission unit 611 to stop the output of the optical transmission signal in accordance with the signal output from the burst control voltage detection unit 622.

Also at times t75 and t76, similarly to the times t73 and t74, the burst control voltage detection unit 622, the control unit 610 and the wavelength-tunable transmission unit 611 operate.

At a time t77, one control pulse is input to the input terminal 615. The wavelength control pulse-counting unit 621 outputs a signal indicating the counted number of pulses "1" to the control unit 610. The control unit 610 selects the wavelength pair (λs1, λr1) on the basis of the number of pulses "1" indicated by the signal and the wavelength table. The control unit 610 sets the wavelength λs1 in the wavelength-tunable transmission unit 611 as a transmission wavelength, and sets the wavelength λr1 in the wavelength-tunable reception unit 612 as a reception wavelength. Then, the wavelength-tunable transmission unit 611 and the wavelength-tunable reception unit 612 perform the transmission/reception of optical signals having the set wavelengths (λs1, λr1).

Figure 19:
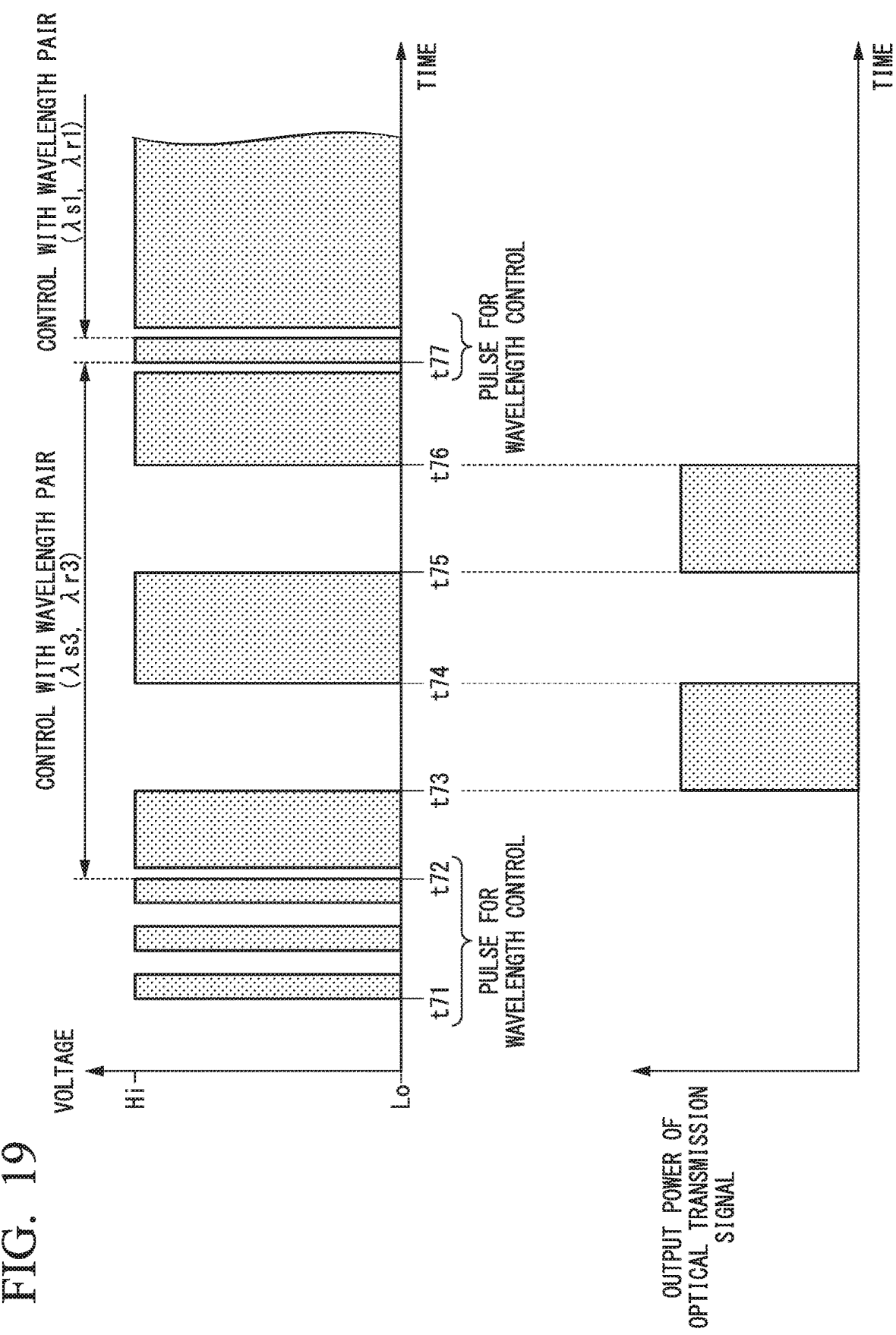
FIG. 19 is a waveform diagram illustrating another example of a relationship between a signal input to an input terminal and an optical transmission signal in the seventh embodiment.

FIG. 19 is a waveform diagram illustrating an example of a relationship between a signal input to the input terminal 615 and an optical transmission signal in the seventh embodiment. In FIG. 19, a vertical axis denotes a voltage of the signal input to the input terminal 615 and output power of the optical transmission signal output from the optical transceiver module 601. A horizontal axis denotes a time. The example illustrated in FIG. 19 is an example in which the burst-disable signal is used as the burst control signal, differently from the example illustrated in FIG. 18. After a time t72 at which the setting of a wavelength pair based on a wavelength control pulse has been completed, a change in a voltage value of the signal input to the input terminal 615 corresponds to waveforms obtained by logically inverting the waveforms illustrated in FIG. 18. That is, in example illustrated in FIG. 19, the signal input to the input terminal 615 is a signal obtained by logically inverting a signal when the burst-enable signal is used as the burst control signal. In the period from the time t72 to the time t77, the operations of the burst control voltage detection unit 622, the control unit 610 and the wavelength-tunable transmission unit 611 are similar to those described in FIG. 18.

According to the optical transceiver module 601, the wavelength selection signal and the burst control signal can be supplied to one pin provided to the input terminal 615. The number of pins used for the selection of a transmission wavelength and a reception wavelength and the control of a transmission timing of an optical transmission signal is reduced, so that further miniaturization of the optical transceiver module 601 is achieved.

Figure 20:
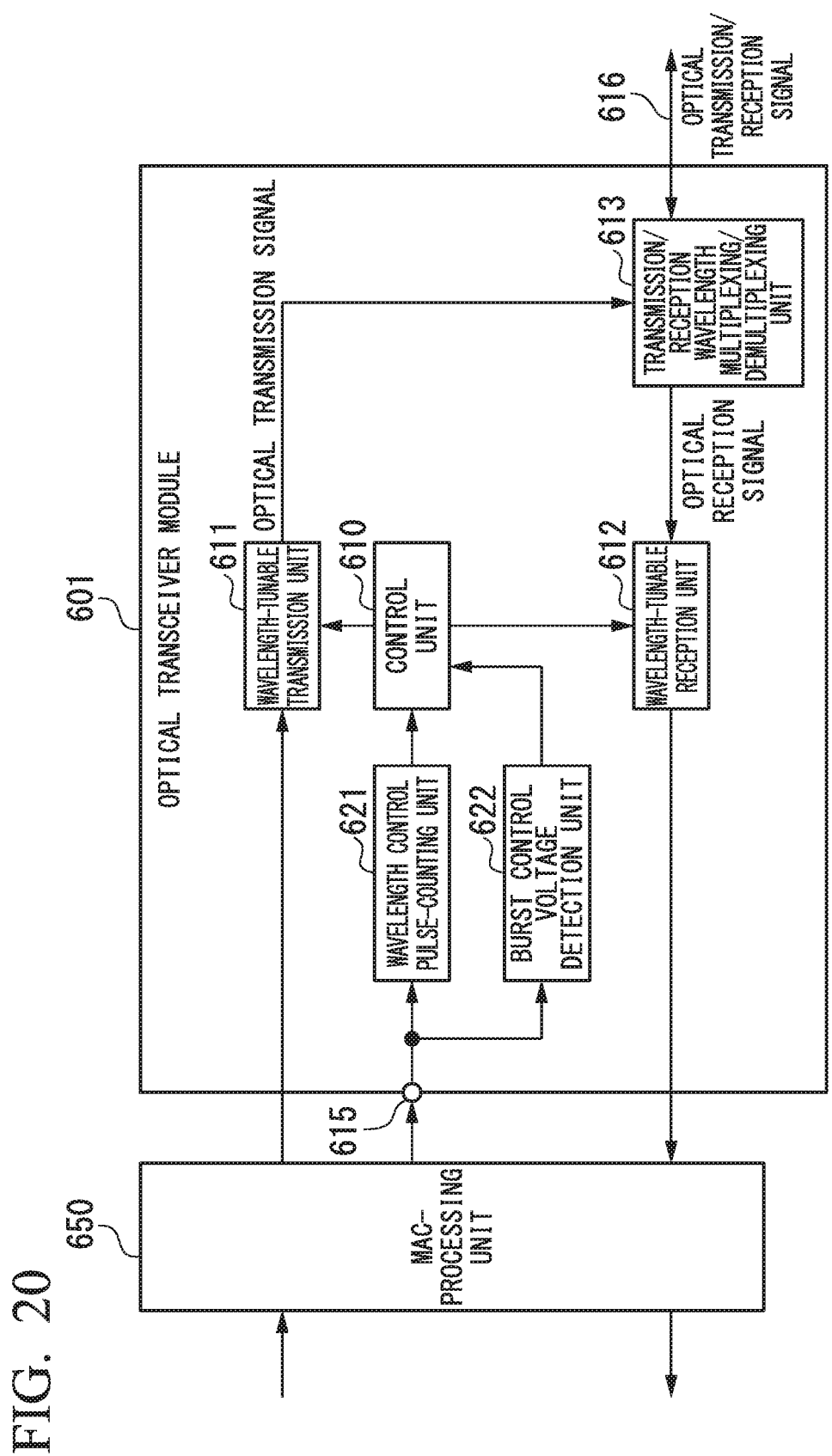
FIG. 20 is a block diagram illustrating a configuration example when the optical transceiver module in the seventh embodiment is applied to an optical transceiver.

FIG. 20 is a block diagram illustrating a configuration example when the optical transceiver module 601 according to the seventh embodiment is applied to an optical transmission/reception device. The optical transceiver module 601 is connected to a media access control (MAC)-processing unit 650. The MAC-processing unit 650 performs output control of an optical transmission signal transmitted by the optical transceiver module 601 via the optical fiber 616, conversion between a frame configuration used for transmitting and receiving an optical signal and a data configuration used by an external device, error detection, error correction and the like.

The MAC-processing unit 650 converts input data supplied from the external device into the frame configuration used for an optical transmission signal and supplies an electric signal obtained through the conversion to the wavelength-tunable transmission unit 611. The MAC-processing unit 650 acquires an electric signal output from the wavelength-tunable reception unit 612 and determines whether the electric signal is a signal addressed to its own device. When the electric signal is the signal addressed to its own device, the MAC-processing unit 650 converts data included in the electric signal into the frame configuration used in the external device and supplies the external device with the electric signal obtained through the conversion. When data instructing a transmission wavelength and a reception wavelength for the own device is included in the electric signal, the MAC-processing unit 650 supplies the input terminal 615 with a wavelength selection signal corresponding to a wavelength pair instructed by the data. When data instructing a transmission timing of an optical transmission signal is included in the electric signal, the MAC-processing unit 650 supplies the input terminal 615 with a burst control signal at a time and in a period instructed by the data.

The optical transmission/reception device illustrated in FIG. 20 can set the transmission wavelength of the wavelength-tunable transmission unit 611 and the reception wavelength of the wavelength-tunable reception unit 612 on the basis of a wavelength pair notified from a host apparatus through the optical fiber 616. The optical transmission/reception device can transmit an optical transmission signal according to a transmission timing notified from the host apparatus. By using the optical transceiver module 601 and the MAC-processing unit 650 in combination, the optical transmission/reception device can transmit and receive an optical signal in accordance with the control of a host apparatus without additionally arranging an input pin for controlling transmission/reception.

The MAC-processing unit 650 illustrated in FIG. 20 may be connected to the optical transceiver modules 1, 101, 201, 301, 401 and 501 in the first to sixth embodiments, and may be used in an optical transmission/reception device. The MAC-processing unit 650 and any one optical transceiver module of the first to sixth embodiments are combined with each other, so that it is possible to transmit and receive an optical signal using a transmission wavelength and a reception wavelength instructed from a host apparatus.

Eighth Embodiment

Figure 21:
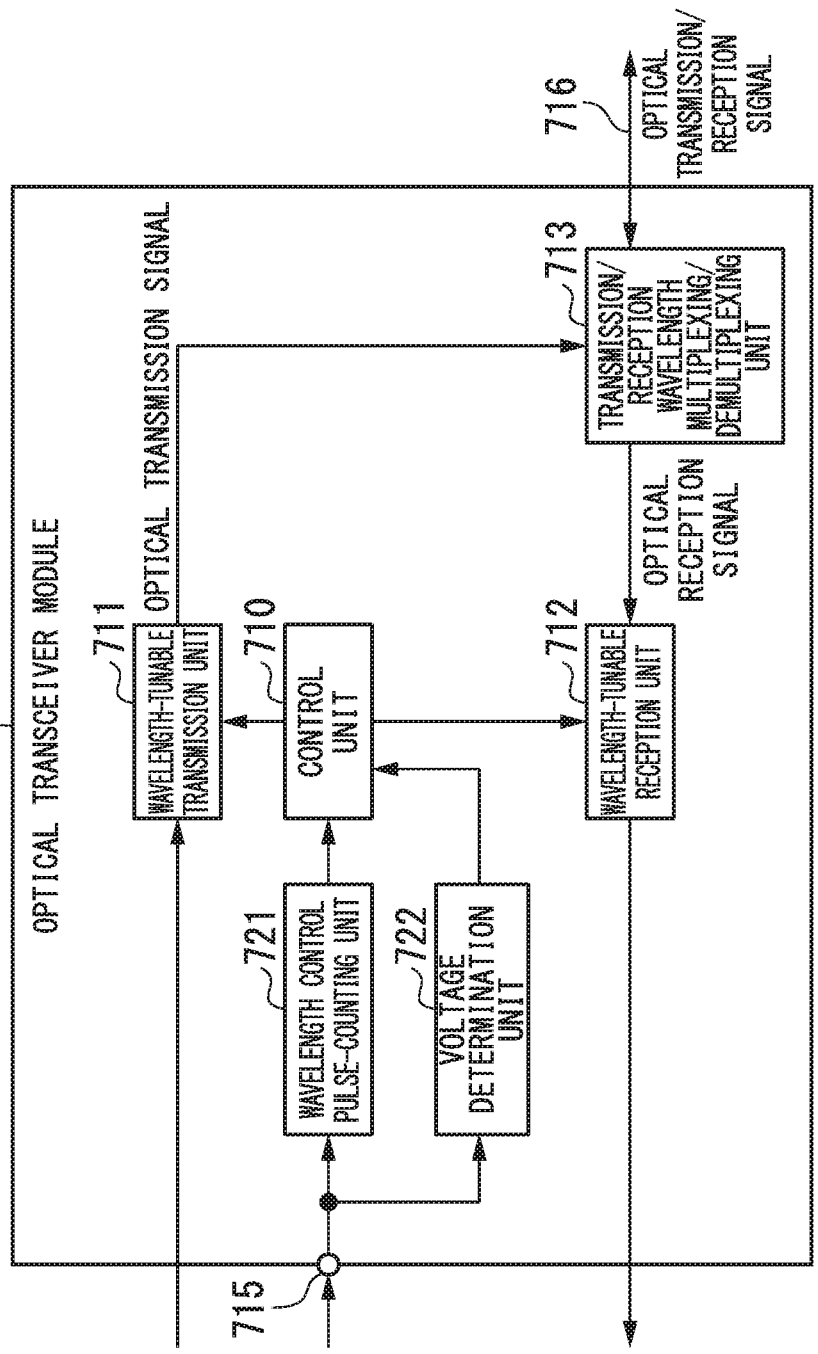
FIG. 21 is a block diagram illustrating a configuration of an optical transceiver module according to an eighth embodiment.

FIG. 21 is a block diagram illustrating a configuration of an optical transceiver module 701 according to an eighth embodiment. The optical transceiver module 701 includes a control unit 710, a wavelength-tunable transmission unit 711, a wavelength-tunable reception unit 712, a transmission/reception wavelength multiplexing/demultiplexing unit 713, a wavelength control pulse-counting unit 721 and a voltage determination unit 722. Similarly to the optical transceiver module 601 in the seventh embodiment, the optical transceiver module 701 switches output and stoppage of an optical transmission signal in accordance with a burst control signal input to an input terminal 715. The optical transceiver module 701 has a configuration in which control based on the burst control signal is added to the optical transceiver module 201 in the third embodiment.

The wavelength-tunable transmission unit 711, the wavelength-tunable reception unit 712 and the transmission/reception wavelength multiplexing/demultiplexing unit 713 perform the same operations as those of the wavelength-tunable transmission unit 11, the wavelength-tunable reception unit 12 and the transmission/reception wavelength multiplexing/demultiplexing unit 13 in the first embodiment. Furthermore, an optical fiber 716 is similar to the optical fiber 16 in FIG. 1. The wavelength control pulse-counting unit 721 performs the same operation as that of the wavelength control pulse-counting unit 621 in the seventh embodiment.

The input terminal 715 is a terminal having one pin. A signal input to the input terminal 715 is supplied to the wavelength control pulse-counting unit 721 and the voltage determination unit 722.

The voltage determination unit 722 measures the voltage value of the signal input to the input terminal 715, and determines whether a reset signal or a burst control signal is input on the basis of the measurement result. When a predetermined high-level voltage is detected in a signal, the voltage determination unit 722 determines that the burst control signal is input. When the high-level voltage is detected, the voltage determination unit 722 determines that the output of an optical transmission signal is instructed and outputs a signal instructing the transmission of the optical transmission signal to the control unit 710. When a predetermined low-level voltage is detected in a signal, the voltage determination unit 722 determines that the output of an optical transmission signal is not instructed and outputs a signal instructing the stoppage of the optical transmission signal to the control unit 710. When a predetermined reset level voltage is detected in a signal, the voltage determination unit 722 determines that the reset signal is input and outputs a signal instructing the reset of a wavelength pair to the control unit 710. In the reset (initialization) of the wavelength pair, a transmission wavelength and a reception wavelength are set using a combination of predetermined transmission wavelength and reception wavelength as an initial value of the wavelength pair.

The control unit 710 selects a wavelength pair on the basis of the signal input from the wavelength control pulse-counting unit 721. Similarly to the control unit 610 of the seventh embodiment, the control unit 710 includes the wavelength table (FIG. 3) indicating correspondence of the number of pulses and the wavelength pair. The wavelength table may be provided outside the control unit 710. The control unit 710 selects a wavelength pair correlated with the number of pulses indicated by an input signal from the wavelength table, and performs transmission wavelength control and reception wavelength control. Similarly to the control unit 610, the control unit 710 performs control for switching the output and the stoppage of the optical transmission signal by the wavelength-tunable transmission unit 711 on the basis of the signal output from the voltage determination unit 722. When the signal instructing the reset of the wavelength pair is output from the voltage determination unit 722, the control unit 710 sets a transmission wavelength and a reception wavelength by using the initial value of the wavelength pair. As the initial value of the wavelength pair, the wavelength pair ($\lambda$s1, $\lambda$r1) is determined for example.

Figure 22:
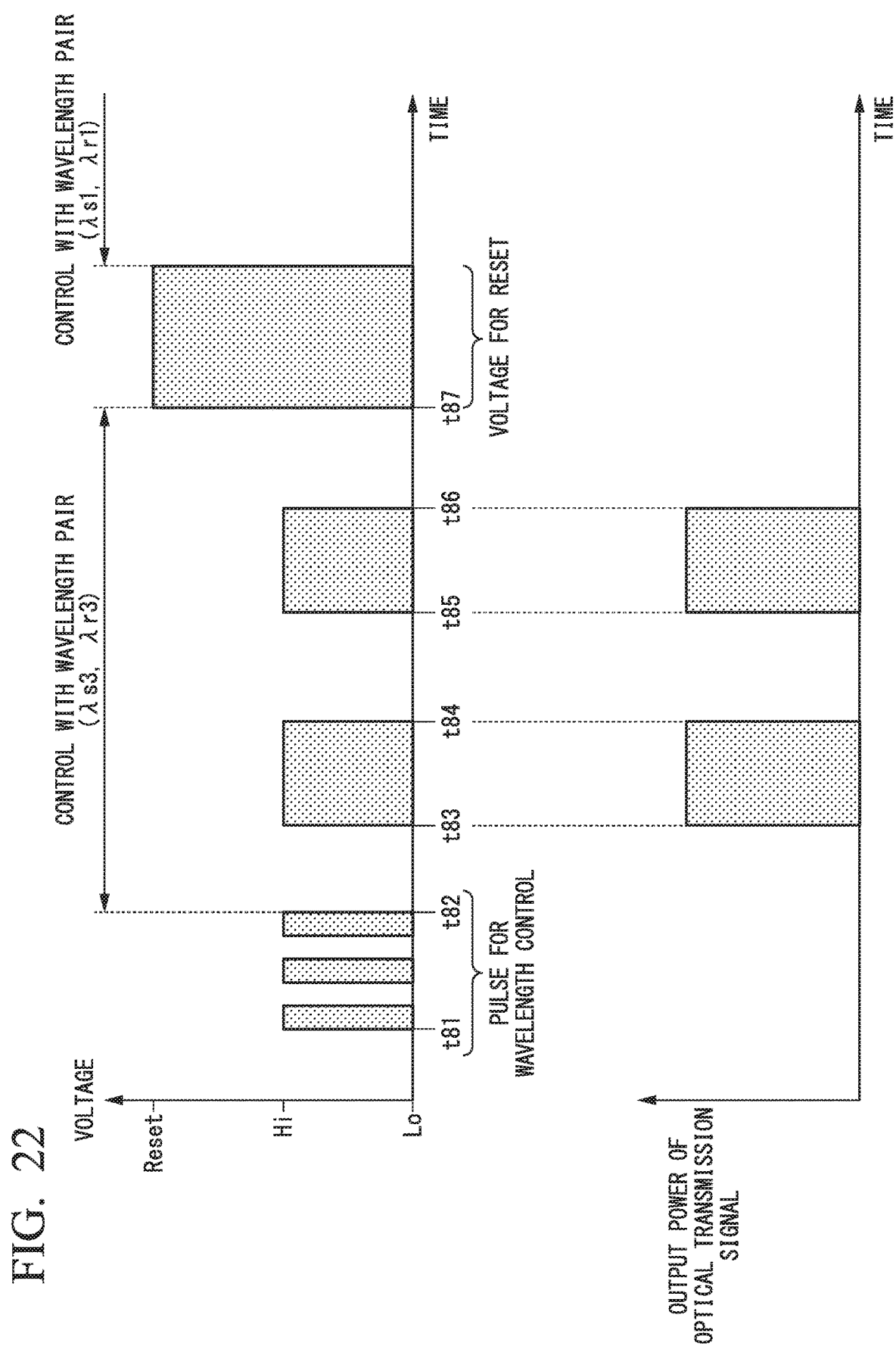
FIG. 22 is a waveform diagram illustrating an example of a relationship between a signal input to an input terminal and an optical transmission signal in the eighth embodiment.

FIG. 22 is a waveform diagram illustrating an example of a relationship between a signal input to the input terminal 715 and an optical transmission signal in the eighth embodiment. In FIG. 22, a vertical axis denotes a voltage of the signal input to the input terminal 715 and output power of the optical transmission signal output from the optical transceiver module 701. A horizontal axis denotes a time. The example illustrated in FIG. 22 is an example in which the burst-enable signal is used as the burst control signal.

In a period from a time t81 to a time t82, three control pulses are input to the input terminal 715. In this period, the operations of the wavelength control pulse-counting unit 721 and the control unit 710 are similar to those of the operations of the wavelength control pulse-counting unit 621 and the control unit 610 in the period from the time t71 to the time t72 illustrated in FIG. 18.

In a period from a time t83 to a time t84 after the input of the control pulses is completed and in a period from a time t85 to a time t86, a high-level control voltage is input to the input terminal 715. When it is detected that the voltage value of the signal input from the input terminal 715 is at a high level, the voltage determination unit 722 determines that the burst control signal is input. The voltage determination unit 722 outputs a signal instructing the transmission of an optical transmission signal to the control unit 710 in accordance with the determination result. The control unit 710 causes the wavelength-tunable transmission unit 711 to output an optical transmission signal having the transmission wavelength $\lambda$s3 in accordance with the signal output from the voltage determination unit 722.

At a time t87, a reset level control voltage is input to the input terminal 715. When it is detected that the voltage value of the signal input from the input terminal 715 is at a reset level, the voltage determination unit 722 determines that the reset signal is input. The voltage determination unit 722 outputs a signal instructing the reset of a wavelength pair to the control unit 710 in accordance with the determination result. The control unit 710 sets the initial value ($\lambda$s1, $\lambda$r1) of the wavelength pair in a transmission wavelength and a reception wavelength in accordance with the signal output from the voltage determination unit 722. Then, the wavelength-tunable transmission unit 711 and the wavelength-tunable reception unit 712 perform the transmission/reception of optical signals having the set wavelengths ($\lambda$s1, $\lambda$r1).

FIG. 22 illustrates the case where the burst-enable signal is used as the burst control signal; however, the burst-disable signal may be used as the burst control signal. In this case, the voltage level of the signal in the period from the time t82 to the time t87 corresponds to a waveform obtained by inverting the waveform of the burst-enable signal as illustrated in FIG. 19.

The example illustrated in FIG. 22 represents the case where a voltage higher than a high-level voltage in the burst control signal is set as a reset level voltage in the reset signal. However, if the voltage determination unit 722 can distinguish a high level and a reset level from each other, the high-level voltage may be higher than the reset level voltage. The configuration in which the voltage determination unit 722 performs the operation for detecting the burst control signal and the operation for detecting the reset signal has been described; however, a determination unit or a determination circuit may be individually provided to each operation.

According to the optical transceiver module 701, the wavelength selection signal, the reset signal, and the burst control signal are supplied to one pin provided to the input terminal 715, thus further miniaturization is achieved. The optical transceiver module 701 may also be connected to the MAC-processing unit 650 for use as illustrated in FIG. 20. An optical transmission/reception device including the optical transceiver module 701 and the MAC-processing unit 650 can transmit and receive an optical signal under the control of a host apparatus without adding an input pin to the control of transmission/reception.

Ninth Embodiment

Figure 23:
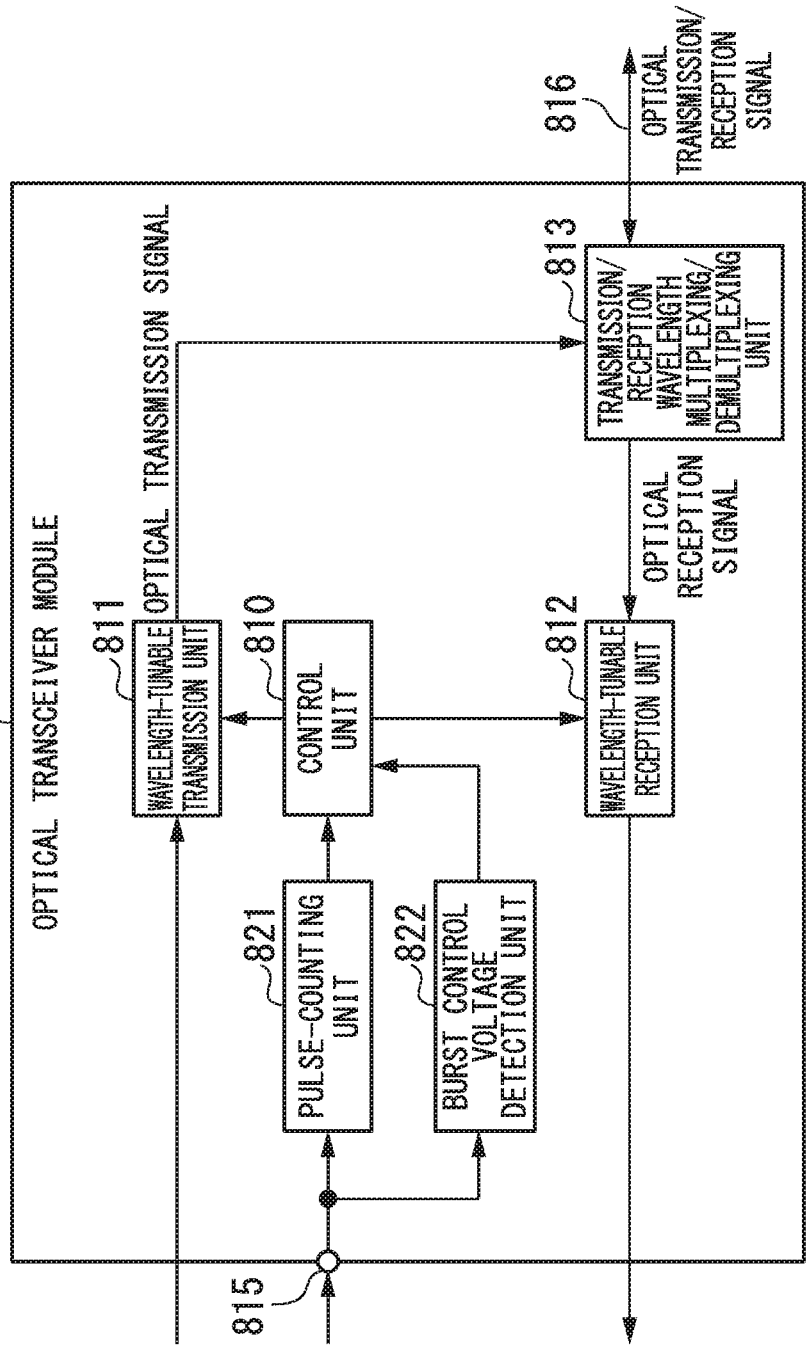
FIG. 23 is a block diagram illustrating a configuration of an optical transceiver module according to a ninth embodiment.

FIG. 23 is a block diagram illustrating a configuration of an optical transceiver module 801 according to a ninth embodiment. The optical transceiver module 801 includes a control unit 810, a wavelength-tunable transmission unit 811, a wavelength-tunable reception unit 812, a transmission/reception wavelength multiplexing/demultiplexing unit 813, an input terminal 815, a pulse-counting unit 821 and a burst control voltage detection unit 822. Similarly to the optical transceiver module 601 in the seventh embodiment, the optical transceiver module 801 switches output and stoppage of an optical transmission signal in accordance with a burst control signal input to the input terminal 815. The optical transceiver module 801 has a configuration in which control based on the burst control signal is added to the optical transceiver module 301 in the fourth embodiment.

The optical transceiver module 801 transmits and receives an optical signal to and from another device via an optical fiber 816 connected to the transmission/reception wavelength multiplexing/demultiplexing unit 813. The wavelength-tunable transmission unit 811, the wavelength-tunable reception unit 812 and the transmission/reception wavelength multiplexing/demultiplexing unit 813 perform the same operations as those of the wavelength-tunable transmission unit 11, the wavelength-tunable reception unit 12 and the transmission/reception wavelength multiplexing/demultiplexing unit 13 in the first embodiment. Furthermore, the optical fiber 816 is similar to the optical fiber 16 in FIG. 1. The burst control voltage detection unit 822 performs an operation similar to that of the burst control voltage detection unit 622 in the seventh embodiment.

The input terminal 815 is a terminal having one pin. A control signal input to the input terminal 815 is supplied to the pulse-counting unit 821 and the burst control voltage detection unit 822.

The pulse-counting unit 821 counts the number of pulses in the signal input to the input terminal 815. The pulse to be counted by the pulse-counting unit 821 includes two types of pulses of a wavelength control pulse and a reset pulse. The two types of pulses each have predetermined pulse width and voltage value. The voltage values of the wavelength control pulse and the reset pulse are different from each other. In the ninth embodiment, a description will be provided for a case where the voltage value of the reset pulse is higher than that of the wavelength control pulse. It is to be noted that the voltage value of the wavelength control pulse may be higher than that of the reset pulse.

Since the wavelength control pulse and the reset pulse are not input to the input terminal 815 in combination, when any one of the wavelength control pulse and the reset pulse is detected, the pulse-counting unit 821 counts the number of the detected pulse. When the voltage value of the signal input to the input terminal 815 is constant over a predetermined period, the pulse-counting unit 821 may determine that the input of a pulse to be counted has been ended. The pulse-counting unit 821 outputs a signal indicating the counted number of pulses and the type of the counted pulses to the control unit 810.

The control unit 810 selects a wavelength pair on the basis of the signal input from the pulse-counting unit 821. Similarly to the transmission/reception wavelength control unit 110 of the second embodiment, the control unit 810 includes the wavelength table (FIG. 3) indicating correspondence of the number of pulses and the wavelength pair. The wavelength table may be provided outside the control unit 810. When a pulse type indicated by the signal input from the pulse-counting unit 821 is the wavelength control pulse, the control unit 810 selects a wavelength pair correlated with the number of wavelength control pulses indicated by the signal from the wavelength table, and performs transmission wavelength control and reception wavelength control.

When the pulse type indicated by the signal input from the pulse-counting unit 821 is the reset pulse, the control unit 810 sets a transmission wavelength and a reception wavelength by using a combination of the transmission wavelength and reception wavelength determined in advance as the initial value of the wavelength pair. As the initial value of the wavelength pair, the wavelength pair ($\lambda s1$, $\lambda r1$) is determined for example. The control unit 810 may reset the wavelength pair only when the pulse type is the reset pulse and the number of pulses coincides with a predetermined number.

Similarly to the control unit 610, the control unit 810 performs control for switching the output and the stoppage of an optical transmission signal by the wavelength-tunable transmission unit 811 on the basis of the signal output from the burst control voltage detection unit 822.

Figure 24:
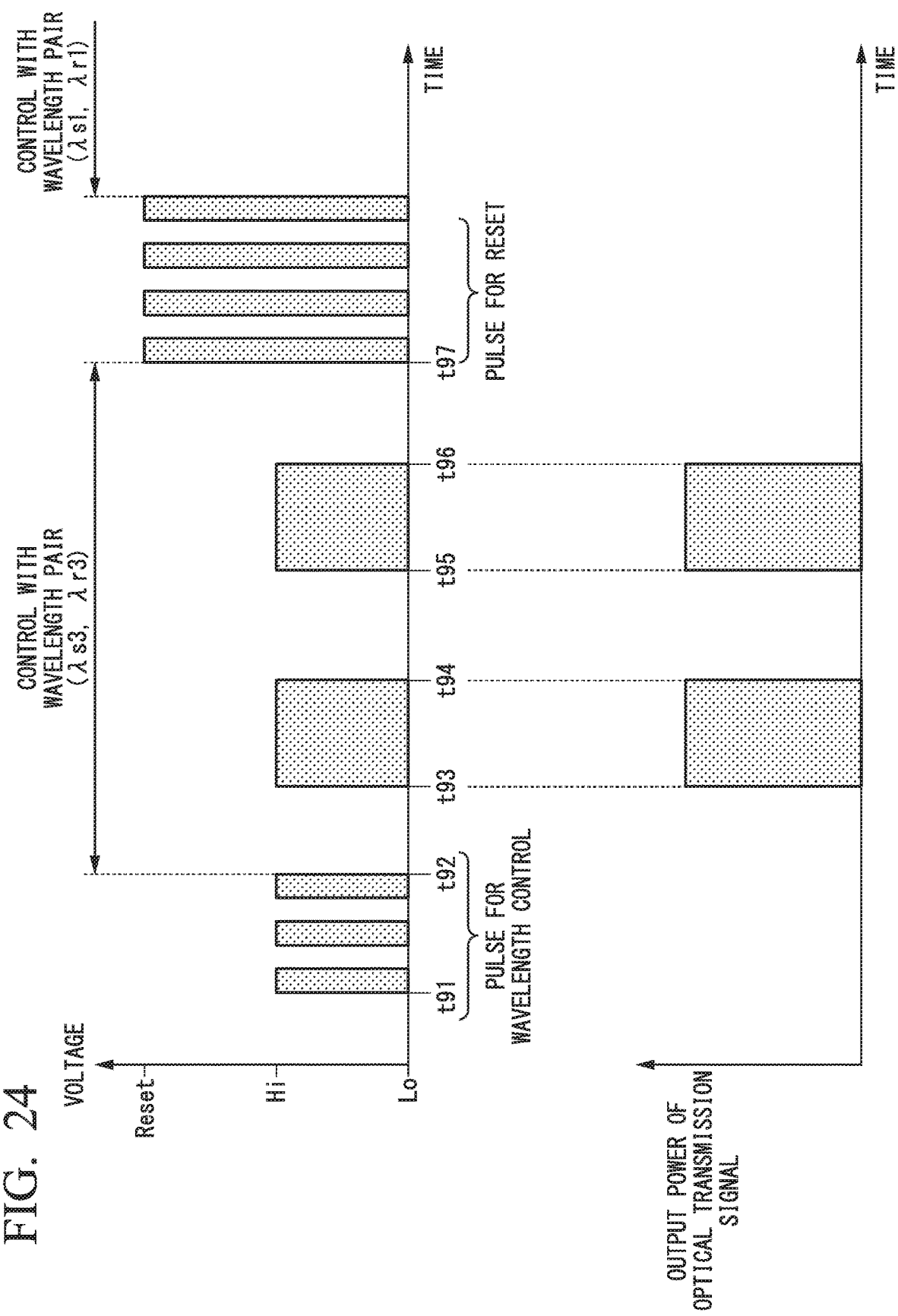
FIG. 24 is a waveform diagram illustrating an example of a relationship between a signal input to an input terminal and an optical transmission signal in the ninth embodiment.

FIG. 24 is a waveform diagram illustrating an example of a relationship between a signal input to the input terminal 815 and an optical transmission signal in the ninth embodiment. In FIG. 24, a vertical axis denotes a voltage of the signal input to the input terminal 815 and output power of the optical transmission signal output from the optical transceiver module 801. A horizontal axis denotes a time. The example illustrated in FIG. 24 is an example in which the burst-enable signal is used as the burst control signal.

In a period from a time t91 to a time t92, three control pulses are input to the input terminal 815. When it is detected that the control pulses of the signal input to the input terminal 815 are the wavelength control pulses, the pulse-counting unit 821 counts the number of the wavelength control pulses. The pulse-counting unit 821 outputs a signal indicating that the control pulse is the wavelength control pulse and the number of pulses "3" to the control unit 810. When it is determined that a pulse type indicated by the signal output from the pulse-counting unit 821 is the wavelength control pulse, the control unit 810 selects the wavelength pair (λs3, λr3) corresponding to the number of pulses "3" indicated by the signal from the wavelength table. The control unit 810 sets the wavelength λs3 in the wavelength-tunable transmission unit 811 as a transmission wavelength, and sets the wavelength λr3 in the wavelength-tunable reception unit 812 as a reception wavelength.

The operations of the burst control voltage detection unit 822, the control unit 810 and the wavelength-tunable transmission unit 811 in a period from a time t93 to a time t94 after the input of the control pulses is completed are similar to those of the wavelength control pulse-counting unit 621, the control unit 610 and the wavelength-tunable transmission unit 611 in the period from the time t73 to the time t74 illustrated in FIG. 18. Furthermore, the operations of the burst control voltage detection unit 822, the control unit 810 and the wavelength-tunable transmission unit 811 in a period from a time t95 to a time t96 are similar to those of them in the period from the time t93 to the time t94.

After a time t97, the reset pulse is input to the input terminal 815. When it is determined that a control pulse of the signal input to the input terminal 815 is the reset pulse, the pulse-counting unit 821 counts the number of reset pulses. When the counting of the number of pulses is ended, the pulse-counting unit 821 outputs a signal indicating that the control pulse is the reset pulse and indicating the number of pulses to the control unit 810. The control unit 810 sets the initial value (λs1, λr1) of the wavelength pair in a transmission wavelength and a reception wavelength in accordance with the signal output from the pulse-counting unit 821. Then, the wavelength-tunable transmission unit 811 and the wavelength-tunable reception unit 812 perform the transmission and reception of optical signals having the set wavelengths (λs1, λr1).

FIG. 24 illustrates the case where the burst-enable signal is used as the burst control signal; however, the burst-disable signal may be used as the burst control signal. In this case, the voltage level of the control signal in the period from the time t92 to the time t97 corresponds to a waveform obtained by inverting the waveform of the burst-enable signal as illustrated in FIG. 19.

The example illustrated in FIG. 24 represents the case where a voltage higher than that of the wavelength control pulse is set as the voltage of the reset pulse. However, if the pulse-counting unit 821 can distinguish the wavelength control pulse and the reset pulse from each other, the voltage of the wavelength control pulse may be higher than that of the reset pulse. The example illustrated in FIG. 24 represents the case where the voltage of the wavelength control pulse is identical to the high-level voltage in the burst control signal. However, if the burst control voltage detection unit 822 can detect the burst control signal, the voltage of the wavelength control pulse may not be identical to the high-level voltage in the burst control signal. For example, the high-level voltage in the burst control signal may be identical to the voltage of the reset pulse. The configuration in which the pulse-counting unit 821 performs the operation for counting the wavelength control pulse and the operation for counting the reset pulse has been described; however, a counting unit or a counting circuit may be individually provided to each operation.

According to the optical transceiver module 801, the wavelength selection signal, the reset signal and the burst control signal can be supplied to one pin provided to the input terminal 815, so that further miniaturization is achieved. The optical transceiver module 801 may also be connected to the MAC-processing unit 650 for use as illustrated in FIG. 20. An optical transmission/reception device including the optical transceiver module 801 and the MAC-processing unit 650 can transmit and receive an optical signal under the control of a host apparatus without adding an input pin to the control of transmission and reception.

The wavelength-tunable transmission units 11, 111, 211, 311, 411, 511, 611, 711 and 811 in the first to ninth embodiments may drive a laser diode (LD) by using an electric signal supplied from an exterior of the optical transceiver modules 1, 101, 201, 301, 401, 501, 601, 701 and 801, thereby converting the electric signal into an optical transmission signal. Alternatively, the wavelength-tunable transmission units 11, 111, 211, 311, 411, 511, 611, 711 and 811 may perform modulation for changing at least one of a phase, an amplitude and a polarization plane of local light, which is emitted from the LD, by an electric signal supplied from an exterior, thereby converting the electric signal into an optical transmission signal. In all the cases of using the LD and performing the modulation, the wavelength-tunable transmission units 11, 111, 211, 311, 411, 511, 611, 711 and 811 output an optical transmission signal having a wavelength set to a transmission wavelength.

The wavelength-tunable reception units 12, 112, 212, 312, 412, 512, 612, 712 and 812 in the first to ninth embodiments may convert, into an electric signal, an optical reception signal having a wavelength set to a reception wavelength among optical reception signals having each wavelength and supplied via the transmission/reception wavelength multiplexing/demultiplexing unit 13, 113, 213, 313, 413, 513, 613, 713 and 813. For the demultiplexing, a diffraction grating, a wavelength filter and the like are used for example. Alternatively, the wavelength-tunable reception units 12, 112, 212, 312, 412, 512, 612, 712 and 812 may convert a supplied optical reception signal into an electric signal and extract a signal corresponding to a wavelength set to a reception wavelength from the electric signal. The wavelength-tunable reception units 12, 112, 212, 312, 412, 512, 612, 712 and 812 output the acquired electric signal to an exterior of the optical transceiver modules 1, 101, 201, 301, 401, 501, 601, 701 and 801.

As the transmission/reception wavelength multiplexing/demultiplexing unit 13, 113, 213, 313, 413, 513, 613, 713 and 813 in the first to ninth embodiments, an optical coupler or an optical splitter is used for example. The optical transceiver modules 1, 101, 201, 301, 401, 501, 601, 701 and 801 may not include the transmission/reception wavelength multiplexing/demultiplexing unit 13, 113, 213, 313, 413, 513, 613, 713 and 813, respectively. When the optical transceiver modules 1, 101, 201, 301, 401, 501, 601, 701 and 801 do not include the transmission/reception wavelength multiplexing/demultiplexing unit 13, 113, 213, 313, 413, 513, 613, 713 and 813, respectively, the optical transceiver modules 1, 101, 201, 301, 401, 501, 601, 701 and 801 include an input port, through which an optical reception signal is input from the optical fibers 16, 116, 216, 316, 416, 516, 616, 716 and 816, and an output port, through which an optical transmission signal is output to the optical fibers 16, 116, 216, 316, 416, 516, 616, 716 and 816, respectively. The optical reception signal input to the input port is supplied to the wavelength-tunable reception units 12, 112, 212, 312, 412, 512, 612, 712 and 812. The optical transmission signal output from the wavelength-tunable transmission units 11, 111, 211, 311, 411, 511, 611, 711 and 811 is supplied to the output port.

The optical transceiver modules 101, 201, 301, 401 and 501 as the optical transceiver described in the second to sixth embodiments respectively include the wavelength-tunable transmission units 111, 211, 311, 411 and 511 that transmit an optical transmission signal, the wavelength-tunable reception units 112, 212, 312, 412 and 512 that receive an optical reception signal, the wavelength table or the transmission/reception wavelength selection table 522 that stores a plurality of combinations of transmission wavelengths and reception wavelengths, the input terminals 115, 215, 315, 415 and 515 through which a wavelength selection signal is input, and the transmission/reception wavelength control units 110, 210, 310, 410 and 510 (hereinafter, referred to as "control units") that control the wavelength-tunable transmission units 111, 211, 311, 411 and 511 and the wavelength-tunable reception units 112, 212, 312, 412 and 512. The optical transceiver modules 601, 701 and 801 as the optical transceiver described in the seventh to ninth embodiments respectively include the wavelength-tunable transmission units 611, 711 and 811 that transmit an optical transmission signal, the wavelength-tunable reception units 612, 712 and 812 that receive an optical reception signal, the wavelength table that stores a plurality of combinations of transmission wavelengths and reception wavelengths, the input terminals 615, 715 and 815 through which a wavelength selection signal is input, and the control units 610, 710 and 810 that control the wavelength-tunable transmission units 611, 711 and 811 and the wavelength-tunable reception units 612, 712 and 812. The control units 110, 210, 310, 410, 510, 610, 710 and 810 select a combination of the transmission wavelength and the reception wavelength from the wavelength table or the transmission/reception wavelength selection table 522 on the basis of the wavelength selection signal, and perform two types of control, that is, transmission wavelength control for setting the selected transmission wavelength in the wavelength-tunable transmission units 111, 211, 311, 411, 511, 611, 711 and 811 as a wavelength of the optical transmission signal, and reception wavelength control for setting the selected reception wavelength in the wavelength-tunable reception units 112, 212, 312, 412, 512, 612, 712 and 812 as a wavelength of the optical reception signal. According to the optical transceiver modules 101, 201, 301, 401, 501, 601, 701 and 801 configured as described above, it is possible to select a combination of the transmission wavelengths and the reception wavelengths by using one input terminal 115, 215, 315, 415, 515, 615, 715, or 815, so that it is possible to reduce the number of terminals to be used in control for an optical signal to be transmitted/received.

So far, the embodiments of the present invention have been described with reference to the accompanying drawings. However, detailed configurations are not limited to the embodiments and the present invention includes design and the like in a range not departing from the spirit of the present invention.

INDUSTRIAL APPLICABILITY

The present invention can be applied to a use for which it is necessary to decrease the number of terminals used for controlling optical signals to be transmitted and received.

REFERENCE SIGNS LIST 1, 101, 201, 301, 401, 501, 601, 701, 801 Optical transceiver module 10, 110, 210, 310, 410, 510 Transmission/reception wavelength control unit
11, 111, 211, 311, 411, 511, 611, 711, 811 Wavelength-tunable transmission unit
12, 112, 212, 312, 412, 512, 612, 712, 812 Wavelength-tunable reception unit
15, 115, 215, 315, 415, 515, 615, 715, 815 Input terminal
121, 221, 321, 621, 721 Wavelength control pulse-counting unit
222 Reset voltage detection unit
322 Reset pulse detection unit
421, 521 Wavelength control voltage determination unit
522 Transmission/reception wavelength selection table
610, 710, 810 Control unit
622, 822 Burst control voltage detection unit
650 MAC-processing unit
722 Voltage determination unit
821 Pulse-counting unit

The invention claimed is:

1. An optical transceiver comprising:
a wavelength-tunable transmitter configured to transmit an optical transmission signal;
a wavelength-tunable receiver configured to receive an optical reception signal;
an input terminal configured to input a wavelength selection signal as one or more of control pulses;
a wavelength table configured to store a plurality of combinations of a transmission wavelength and a reception wavelength, each of the plurality of combinations being correlated with a respective number of the control pulses; and
a controller configured to select one combination of the transmission wavelength and the reception wavelength, which corresponds to the number of the control pulses as the wavelength selection signal, from the wavelength table, and performs transmission wavelength control for setting the selected transmission wavelength in the wavelength-tunable transmitter as a wavelength of the optical transmission signal and reception wavelength control for setting the selected reception wavelength in the wavelength-tunable receiver as a wavelength of the optical reception signal.

2. An optical transceiver comprising:
a wavelength-tunable transmitter configured to transmit an optical transmission signal;
a wavelength-tunable receiver configured to receive an optical reception signal;
an input terminal configured to input a wavelength selection signal as a control voltage of any one of a plurality of predetermined voltage values;
wherein the a wavelength table configured to store a plurality of combinations of a transmission wavelength and a reception wavelength, each of the plurality of combinations being correlated with a respective voltage value of the plurality of predetermined voltage values; and
a controller configured to select one combination of the transmission wavelength and the reception wavelength, which corresponds to the control voltage as the wavelength selection signal, from the wavelength table, and performs transmission wavelength control for setting the selected transmission wavelength in the wavelength-tunable transmitter as a wavelength of the optical transmission signal and reception wavelength control for setting the selected reception wavelength in the wavelength-tunable receiver as a wavelength of the optical reception signal.

3. The optical transceiver according to claim 1,
wherein a transmission control signal determined by a voltage value corresponding to each of transmission and stoppage of the optical transmission signal is input to the input terminal, and
wherein the controller controls the transmission of the optical transmission signal by the wavelength-tunable transmitter in accordance with the transmission control signal.

4. The optical transceiver according to claim 1,
wherein a reset signal instructing initialization for the transmission wavelength and the reception wavelength is input to the input terminal as a predetermined voltage value or a predetermined number of control pulses, and
wherein the controller selects a predetermined combination of the transmission wavelength and the reception wavelength in accordance with the reset signal, and performs the transmission wavelength control and the reception wavelength control.

5. A control method in an optical transceiver including a wavelength-tunable transmitter that transmits an optical transmission signal, a wavelength-tunable receiver that receives an optical reception signal, a wavelength table that stores a plurality of combinations of a transmission wavelength and a reception wavelength, and an input terminal through which a wavelength selection signal is input, each of the plurality of combinations being correlated with a respective number of the control pulses, the control method comprising:
  inputting the wavelength selection signal as one or more control pulses:
  selecting one combination of the transmission wavelength and the reception wavelength, which corresponds to the number of the control pulses as the wavelength selection signal, from the wavelength table;
  setting the selected transmission wavelength in the wavelength-tunable transmitter as a wavelength of the optical transmission signal; and
  setting the selected reception wavelength in the wavelength-tunable receiver as a wavelength of the optical reception signal.

6. A control method in an optical transceiver including a wavelength-tunable transmitter that transmits an optical transmission signal, a wavelength-tunable receiver that receives an optical reception signal, a wavelength table that stores a plurality of combinations of a transmission wavelength and a reception wavelength, and an input terminal through which a wavelength selection signal is input, each of the plurality of combinations being correlated with a respective voltage value of the plurality of predetermined voltage values, the control method comprising:
  inputting the wavelength selection signal as a control voltage of any one of a plurality of predetermined voltage values;
  selecting one combination of the transmission wavelength and the reception wavelength, which corresponds to the control voltage as the wavelength selection signal, from the wavelength table;
  setting the selected transmission wavelength in the wavelength-tunable transmitter as a wavelength of the optical transmission signal; and
  setting the selected reception wavelength in the wavelength-tunable receiver as a wavelength of the optical reception signal.

7. The optical transceiver according to claim 3,
wherein a reset signal instructing initialization for the transmission wavelength and the reception wavelength is input to the input terminal as a predetermined voltage value or a predetermined number of control pulses, and
wherein the controller selects a predetermined combination of the transmission wavelength and the reception wavelength in accordance with the reset signal, and performs the transmission wavelength control and the reception wavelength control.

\* \* \* \* \*